(12) United States Patent
Lezama Guadarrama et al.

(10) Patent No.: US 8,302,014 B2
(45) Date of Patent: Oct. 30, 2012

(54) MERGING MODIFICATIONS TO USER INTERFACE COMPONENTS WHILE PRESERVING USER CUSTOMIZATIONS

(75) Inventors: Humberto Lezama Guadarrama, Redmond, WA (US); Andrew N. Magee, Issaquah, WA (US); Tyler M. Peelen, Kirkland, WA (US); James S. Head, Bellevue, WA (US); Ronghua Jin, Sammamish, WA (US); Rubaiyat Khan, Redmond, WA (US); Richard L. Dickinson, Seattle, WA (US); John C. Robinson, Mercer Island, WA (US); Mesganaw Anteneh, Bellevue, WA (US); Brandon J. Simons, Bothell, WA (US); Nicholas J. Patrick, Bellevue, WA (US); Vicentiu Adrian Omusoru, Redmond, WA (US); Ankini Shah, Bellevue, WA (US); Atul Shenoy, Seattle, WA (US); Bharath Swaminathan, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 91 days.

(21) Appl. No.: 12/814,084

(22) Filed: Jun. 11, 2010

(65) Prior Publication Data
US 2011/0307798 A1 Dec. 15, 2011

(51) Int. Cl.
*G06F 3/00* (2006.01)
*G06F 3/048* (2006.01)

(52) U.S. Cl. ........ 715/744; 715/745; 715/746; 715/747; 715/762

(58) Field of Classification Search .................. 715/744, 715/745–747, 762
See application file for complete search history.

(56) References Cited

U.S. PATENT DOCUMENTS

| | | | |
|---|---|---|---|
| 5,155,806 A | 10/1992 | Hoeber | |
| 5,377,354 A | 12/1994 | Scannell | |
| 5,500,936 A | 3/1996 | Allen | |
| 5,519,606 A | 5/1996 | Frid-Nielsen | |
| 5,533,184 A * | 7/1996 | Malcolm | 715/762 |
| 5,559,944 A | 9/1996 | Ono | |
| 5,570,109 A | 10/1996 | Jenson | |
| 5,588,107 A | 12/1996 | Bowden | |
| 5,596,694 A | 1/1997 | Capps | |
| 5,625,783 A | 4/1997 | Ezekiel | |

(Continued)

FOREIGN PATENT DOCUMENTS

CN 101243439 B 6/2012

(Continued)

OTHER PUBLICATIONS

U.S. Non-Final Office Action dated Sep. 21, 2010 in U.S. Appl. No. 11/217,071.

(Continued)

*Primary Examiner* — Steven B Theriault
(74) *Attorney, Agent, or Firm* — Merchant & Gould

(57) ABSTRACT

An application displays a user interface (UI) component. A client can apply customizations to this UI component. After the client applies customizations to the UI component, the client modifies a solution set containing solutions that modify the UI component. After the client modifies the solution set, the application displays a new version of the UI component. Modifications provided by the solutions in the solution set are applied to the new version of the UI component. In addition, the customizations remain applied to the UI component without the client manually re-applying the customizations to the UI component.

15 Claims, 12 Drawing Sheets

U.S. PATENT DOCUMENTS

| | | | |
|---|---|---|---|
| 5,634,100 A | 5/1997 | Capps | |
| 5,634,128 A | 5/1997 | Messina | |
| 5,638,504 A | 6/1997 | Scott | |
| 5,644,737 A | 7/1997 | Tuniman | |
| 5,659,693 A | 8/1997 | Hansen | |
| 5,664,127 A | 9/1997 | Anderson | |
| 5,664,208 A | 9/1997 | Pavley | |
| 5,673,403 A | 9/1997 | Brown | |
| 5,721,847 A | 2/1998 | Johnson | |
| 5,734,915 A | 3/1998 | Roewer | |
| 5,760,768 A | 6/1998 | Gram | |
| 5,760,773 A | 6/1998 | Berman | |
| 5,761,646 A | 6/1998 | Frid-Nielsen | |
| 5,778,402 A | 7/1998 | Gipson | |
| 5,778,404 A | 7/1998 | Capps | |
| 5,805,167 A | 9/1998 | Van Cruyningen | |
| 5,812,132 A | 9/1998 | Goldstein | |
| 5,821,936 A | 10/1998 | Shaffer | |
| 5,828,376 A | 10/1998 | Solimene | |
| 5,838,321 A | 11/1998 | Wolf | |
| 5,842,009 A | 11/1998 | Borovoy | |
| 5,844,558 A | 12/1998 | Kumar | |
| 5,844,572 A | 12/1998 | Schott | |
| 5,855,006 A | 12/1998 | Huemoeller | |
| 5,885,006 A | 3/1999 | Sheedy | |
| 5,893,125 A | 4/1999 | Shostak | |
| 5,898,436 A | 4/1999 | Stewart | |
| 5,899,979 A | 5/1999 | Miller | |
| 5,905,863 A | 5/1999 | Knowles | |
| 5,914,714 A * | 6/1999 | Brown | 715/866 |
| 5,926,806 A | 7/1999 | Marshall | |
| 5,936,625 A | 8/1999 | Kahl et al. | |
| 5,940,078 A | 8/1999 | Nagarajayya | |
| 5,940,847 A | 8/1999 | Fein | |
| 5,943,051 A | 8/1999 | Onda | |
| 5,960,406 A | 9/1999 | Rasansky | |
| 5,970,466 A | 10/1999 | Detjen | |
| 5,999,938 A | 12/1999 | Bliss | |
| 6,002,395 A * | 12/1999 | Wagner et al. | 715/763 |
| 6,008,806 A | 12/1999 | Nakajima | |
| 6,012,075 A | 1/2000 | Fein | |
| 6,018,343 A | 1/2000 | Wang | |
| 6,034,683 A | 3/2000 | Mansour | |
| 6,067,087 A | 5/2000 | Krauss | |
| 6,072,492 A | 6/2000 | Schagen | |
| 6,085,206 A | 7/2000 | Domini | |
| 6,101,480 A | 8/2000 | Conmy | |
| 6,133,915 A | 10/2000 | Arcuri | |
| 6,175,363 B1 | 1/2001 | Williams | |
| 6,188,401 B1 * | 2/2001 | Peyer | 715/805 |
| 6,188,403 B1 | 2/2001 | Sacerdoti | |
| 6,192,381 B1 | 2/2001 | Stiegemeier | |
| 6,211,879 B1 | 4/2001 | Soohoo | |
| 6,216,122 B1 | 4/2001 | Elson | |
| 6,219,670 B1 | 4/2001 | Mocek | |
| 6,222,540 B1 | 4/2001 | Sacerdoti | |
| 6,230,309 B1 | 5/2001 | Turner | |
| 6,232,971 B1 | 5/2001 | Haynes | |
| 6,236,396 B1 | 5/2001 | Jenson | |
| 6,256,628 B1 | 7/2001 | Dobson | |
| 6,278,450 B1 | 8/2001 | Arcuri | |
| 6,289,317 B1 | 9/2001 | Peterson | |
| 6,307,544 B1 | 10/2001 | Harding | |
| 6,323,883 B1 | 11/2001 | Minoura | |
| 6,353,451 B1 | 3/2002 | Teibel | |
| 6,359,634 B1 | 3/2002 | Cragun | |
| 6,373,507 B1 | 4/2002 | Camara | |
| 6,384,849 B1 | 5/2002 | Morcos | |
| 6,405,216 B1 | 6/2002 | Minnaert | |
| 6,424,829 B1 | 7/2002 | Kraft | |
| 6,429,882 B1 | 8/2002 | Abdelnur | |
| 6,433,801 B1 | 8/2002 | Moon | |
| 6,433,831 B1 | 8/2002 | Dinwiddie | |
| 6,456,304 B1 | 9/2002 | Angiulo | |
| 6,459,441 B1 | 10/2002 | Perroux | |
| 6,466,236 B1 | 10/2002 | Pivowar | |
| 6,469,722 B1 | 10/2002 | Kinoe | |
| 6,480,865 B1 | 11/2002 | Lee | |
| 6,493,006 B1 | 12/2002 | Gourdol | |
| 6,493,731 B1 | 12/2002 | Jones | |
| 6,546,417 B1 | 4/2003 | Baker | |
| 6,564,377 B1 | 5/2003 | Jayasimha | |
| 6,570,596 B2 | 5/2003 | Frederiksen | |
| 6,578,192 B1 | 6/2003 | Boehme | |
| 6,583,798 B1 | 6/2003 | Hoek | |
| 6,618,732 B1 | 9/2003 | White | |
| 6,621,504 B1 | 9/2003 | Nadas | |
| 6,621,508 B1 | 9/2003 | Shiraishi | |
| 6,624,831 B1 * | 9/2003 | Shahine et al. | 715/815 |
| 6,635,089 B1 | 10/2003 | Burkett | |
| 6,664,983 B2 | 12/2003 | Ludolph | |
| 6,680,749 B1 | 1/2004 | Anderson | |
| 6,686,938 B1 | 2/2004 | Jobs | |
| 6,691,281 B1 | 2/2004 | Sorge | |
| 6,708,205 B2 | 3/2004 | Sheldon | |
| 6,727,919 B1 | 4/2004 | Reder | |
| 6,732,330 B1 | 5/2004 | Claussen | |
| 6,734,880 B2 | 5/2004 | Chang | |
| 6,750,890 B1 | 6/2004 | Sugimoto | |
| 6,778,990 B2 | 8/2004 | Garcia | |
| 6,785,868 B1 | 8/2004 | Raff | |
| 6,825,859 B1 | 11/2004 | Severenuk | |
| 6,826,729 B1 | 11/2004 | Giesen | |
| 6,850,255 B2 | 2/2005 | Muschetto | |
| 6,857,103 B1 | 2/2005 | Wason | |
| 6,871,195 B2 | 3/2005 | Ryan | |
| 6,882,354 B1 | 4/2005 | Nielsen | |
| 6,904,449 B1 | 6/2005 | Quinones | |
| 6,906,717 B2 | 6/2005 | Couckuyt | |
| 6,915,492 B2 | 7/2005 | Kurtenbach | |
| 6,924,797 B1 | 8/2005 | MacPhail | |
| 6,931,623 B2 | 8/2005 | Vermeire | |
| 6,964,025 B2 | 11/2005 | Angiulo | |
| 6,983,889 B2 | 1/2006 | Alles | |
| 6,988,241 B1 | 1/2006 | Guttman | |
| 6,990,637 B2 | 1/2006 | Anthony | |
| 6,990,654 B2 | 1/2006 | Carroll, Jr. | |
| 7,016,864 B1 | 3/2006 | Notz et al. | |
| 7,027,463 B2 | 4/2006 | Mathew | |
| 7,032,210 B2 | 4/2006 | Alloing | |
| 7,039,596 B1 | 5/2006 | Lu | |
| 7,046,848 B1 | 5/2006 | Olcott | |
| 7,086,006 B2 * | 8/2006 | Subramanian et al. | 715/747 |
| 7,093,162 B2 | 8/2006 | Barga | |
| 7,107,544 B1 | 9/2006 | Luke | |
| 7,110,936 B2 | 9/2006 | Hiew | |
| 7,117,436 B1 | 10/2006 | O'Rourke | |
| 7,152,207 B1 | 12/2006 | Underwood | |
| 7,174,361 B1 * | 2/2007 | Paas | 709/203 |
| 7,188,073 B1 | 3/2007 | Tam | |
| 7,188,158 B1 | 3/2007 | Stanton | |
| 7,212,208 B2 | 5/2007 | Khozai | |
| 7,216,302 B2 | 5/2007 | Rodden | |
| 7,218,976 B2 | 5/2007 | Minagawa | |
| 7,219,305 B2 | 5/2007 | Jennings | |
| 7,225,244 B2 | 5/2007 | Reynolds | |
| 7,234,132 B2 | 6/2007 | Lam | |
| 7,240,323 B1 | 7/2007 | Desai | |
| 7,249,325 B1 | 7/2007 | Donaldson | |
| 7,281,245 B2 * | 10/2007 | Reynar et al. | 717/173 |
| 7,325,204 B2 | 1/2008 | Rogers | |
| 7,328,409 B2 | 2/2008 | Awada | |
| 7,337,185 B2 | 2/2008 | Ellis | |
| 7,346,705 B2 | 3/2008 | Hullot | |
| 7,346,769 B2 | 3/2008 | Forlenza | |
| 7,356,537 B2 * | 4/2008 | Reynar et al. | 715/234 |
| 7,360,174 B2 | 4/2008 | Grossman | |
| 7,386,535 B1 | 6/2008 | Kalucha | |
| 7,386,835 B1 | 6/2008 | Desai | |
| 7,392,249 B1 | 6/2008 | Harris | |
| 7,395,540 B2 * | 7/2008 | Rogers | 719/310 |
| 7,426,713 B2 | 9/2008 | Duggan et al. | |
| 7,472,374 B1 * | 12/2008 | Dillman et al. | 717/102 |
| 7,484,213 B2 | 1/2009 | Mathew | |
| 7,505,954 B2 | 3/2009 | Heidloff | |
| 7,509,628 B2 * | 3/2009 | Hilerio et al. | 717/103 |
| 7,530,029 B2 | 5/2009 | Satterfield | |

| | | |
|---|---|---|
| 7,567,964 B2 | 7/2009 | Brice |
| 7,610,575 B2 * | 10/2009 | Sproule .................... 717/103 |
| 7,627,561 B2 | 12/2009 | Pell |
| 7,668,783 B2 * | 2/2010 | Kim et al. ................ 705/57 |
| 7,769,698 B2 * | 8/2010 | Matic ......................... 705/77 |
| 7,779,386 B2 | 8/2010 | Seitz |
| 7,827,546 B1 * | 11/2010 | Jones et al. ............... 717/173 |
| 7,860,901 B2 * | 12/2010 | Cheng et al. ............. 707/805 |
| 7,886,290 B2 | 2/2011 | Dhanjal |
| 7,908,580 B2 * | 3/2011 | Stubbs et al. ............ 717/100 |
| 7,925,621 B2 * | 4/2011 | Sikchi et al. .............. 707/609 |
| 8,046,683 B2 * | 10/2011 | Larcheveque et al. ........ 715/237 |
| 8,239,882 B2 | 8/2012 | Dhanjal et al. |
| 2002/0007380 A1 | 1/2002 | Bauchot |
| 2002/0036662 A1 | 3/2002 | Gauthier et al. ............. 345/835 |
| 2002/0037754 A1 | 3/2002 | Hama |
| 2002/0052721 A1 | 5/2002 | Ruff |
| 2002/0070977 A1 | 6/2002 | Morcos |
| 2002/0075330 A1 | 6/2002 | Rosenzweig |
| 2002/0078143 A1 | 6/2002 | De Boor |
| 2002/0083097 A1 | 6/2002 | Warrington |
| 2002/0091739 A1 | 7/2002 | Ferlitsch |
| 2002/0122071 A1 | 9/2002 | Camara |
| 2002/0133557 A1 | 9/2002 | Winarski |
| 2002/0135621 A1 | 9/2002 | Angiulo |
| 2002/0140731 A1 | 10/2002 | Subramaniam |
| 2002/0140740 A1 | 10/2002 | Chen |
| 2002/0149623 A1 | 10/2002 | West |
| 2002/0149629 A1 | 10/2002 | Craycroft |
| 2002/0154178 A1 | 10/2002 | Barnett |
| 2002/0163538 A1 | 11/2002 | Shteyn |
| 2002/0175955 A1 | 11/2002 | Gourdol |
| 2002/0196293 A1 | 12/2002 | Suppan |
| 2003/0011638 A1 | 1/2003 | Chung |
| 2003/0011639 A1 | 1/2003 | Webb |
| 2003/0014490 A1 | 1/2003 | Bates |
| 2003/0022700 A1 | 1/2003 | Wang |
| 2003/0025732 A1 | 2/2003 | Prichard |
| 2003/0035917 A1 | 2/2003 | Hyman |
| 2003/0038832 A1 | 2/2003 | Sobol |
| 2003/0043211 A1 | 3/2003 | Kremer |
| 2003/0066025 A1 | 4/2003 | Garner |
| 2003/0070143 A1 | 4/2003 | Maslov |
| 2003/0093490 A1 | 5/2003 | Yamamoto |
| 2003/0097361 A1 | 5/2003 | Huang |
| 2003/0098891 A1 | 5/2003 | Molander |
| 2003/0110191 A1 | 6/2003 | Handsaker |
| 2003/0112278 A1 | 6/2003 | Driskell |
| 2003/0135825 A1 | 7/2003 | Gertner |
| 2003/0160821 A1 | 8/2003 | Yoon |
| 2003/0163455 A1 | 8/2003 | Dettinger |
| 2003/0167310 A1 | 9/2003 | Moody |
| 2003/0169284 A1 | 9/2003 | Dettinger |
| 2003/0195937 A1 | 10/2003 | Kircher |
| 2003/0206646 A1 | 11/2003 | Brackett |
| 2003/0218611 A1 | 11/2003 | Ben-Tovim |
| 2003/0226106 A1 | 12/2003 | McKellar |
| 2003/0227481 A1 * | 12/2003 | Arend et al. ................. 345/762 |
| 2003/0227487 A1 | 12/2003 | Hugh |
| 2003/0233419 A1 | 12/2003 | Beringer |
| 2004/0003351 A1 | 1/2004 | Sommerer |
| 2004/0012633 A1 | 1/2004 | Helt |
| 2004/0056894 A1 | 3/2004 | Zaika |
| 2004/0090315 A1 | 5/2004 | Mackjust |
| 2004/0100504 A1 | 5/2004 | Sommer |
| 2004/0100505 A1 | 5/2004 | Cazier |
| 2004/0107197 A1 | 6/2004 | Shen |
| 2004/0109025 A1 | 6/2004 | Hullot |
| 2004/0109033 A1 | 6/2004 | Vienneau |
| 2004/0117451 A1 | 6/2004 | Chung |
| 2004/0119760 A1 | 6/2004 | Grossman |
| 2004/0122789 A1 | 6/2004 | Ostertag |
| 2004/0128275 A1 | 7/2004 | Moehrle |
| 2004/0133854 A1 | 7/2004 | Black |
| 2004/0142720 A1 | 7/2004 | Smethers |
| 2004/0153373 A1 | 8/2004 | Song et al. |
| 2004/0153968 A1 | 8/2004 | Ching |
| 2004/0164983 A1 | 8/2004 | Khozai |
| 2004/0168153 A1 | 8/2004 | Marvin |
| 2004/0181471 A1 * | 9/2004 | Rogers ........................... 705/31 |
| 2004/0186775 A1 | 9/2004 | Margiloff |
| 2004/0192440 A1 | 9/2004 | Evans |
| 2004/0221234 A1 | 11/2004 | Imai |
| 2004/0230508 A1 | 11/2004 | Minnis |
| 2004/0230906 A1 | 11/2004 | Pik |
| 2004/0239700 A1 | 12/2004 | Baschy |
| 2004/0243938 A1 | 12/2004 | Weise |
| 2004/0268231 A1 | 12/2004 | Tunning |
| 2005/0004990 A1 | 1/2005 | Durazo |
| 2005/0005249 A1 | 1/2005 | Hill |
| 2005/0010871 A1 | 1/2005 | Ruthfield |
| 2005/0021504 A1 | 1/2005 | Atchison |
| 2005/0022116 A1 | 1/2005 | Bowman |
| 2005/0039142 A1 | 2/2005 | Jalon |
| 2005/0043015 A1 | 2/2005 | Muramatsu |
| 2005/0044500 A1 | 2/2005 | Orimoto |
| 2005/0057584 A1 | 3/2005 | Gruen |
| 2005/0086135 A1 | 4/2005 | Lu |
| 2005/0091576 A1 | 4/2005 | Relyea |
| 2005/0097511 A1 | 5/2005 | Bergman |
| 2005/0117179 A1 | 6/2005 | Ito |
| 2005/0138576 A1 | 6/2005 | Baumert |
| 2005/0144241 A1 | 6/2005 | Stata |
| 2005/0154765 A1 | 7/2005 | Seitz |
| 2005/0172262 A1 | 8/2005 | Lalwani |
| 2005/0183008 A1 | 8/2005 | Crider |
| 2005/0203975 A1 * | 9/2005 | Jindal et al. ................. 707/204 |
| 2005/0216863 A1 | 9/2005 | Schumacher |
| 2005/0223329 A1 | 10/2005 | Schwartz |
| 2005/0240902 A1 | 10/2005 | Bunker et al. |
| 2005/0256867 A1 | 11/2005 | Walther |
| 2005/0278656 A1 | 12/2005 | Goldthwaite |
| 2005/0289156 A1 | 12/2005 | Maryka |
| 2006/0015816 A1 | 1/2006 | Kuehner |
| 2006/0020962 A1 | 1/2006 | Stark |
| 2006/0036580 A1 | 2/2006 | Stata |
| 2006/0036945 A1 | 2/2006 | Radtke |
| 2006/0036965 A1 | 2/2006 | Harris |
| 2006/0041545 A1 | 2/2006 | Heidloff |
| 2006/0047644 A1 | 3/2006 | Bocking |
| 2006/0053383 A1 | 3/2006 | Gauthier et al. |
| 2006/0059035 A1 | 3/2006 | Kraft |
| 2006/0069684 A1 * | 3/2006 | Vadlamani et al. ............. 707/10 |
| 2006/0080303 A1 | 4/2006 | Sargent |
| 2006/0080363 A1 * | 4/2006 | Vadlamani et al. ........... 707/200 |
| 2006/0080468 A1 * | 4/2006 | Vadlamani et al. ........... 709/250 |
| 2006/0095865 A1 | 5/2006 | Rostom |
| 2006/0101051 A1 | 5/2006 | Carr |
| 2006/0101350 A1 | 5/2006 | Scott |
| 2006/0111931 A1 | 5/2006 | Johnson |
| 2006/0117249 A1 | 6/2006 | Hu |
| 2006/0129937 A1 | 6/2006 | Shafron |
| 2006/0165105 A1 | 7/2006 | Shenfield |
| 2006/0173824 A1 | 8/2006 | Bensky |
| 2006/0200432 A1 | 9/2006 | Flinn et al. |
| 2006/0218500 A1 | 9/2006 | Sauve |
| 2006/0224946 A1 | 10/2006 | Barrett |
| 2006/0242557 A1 | 10/2006 | Nortis, III |
| 2006/0242575 A1 | 10/2006 | Winser |
| 2006/0242591 A1 | 10/2006 | Van Dok |
| 2006/0253830 A1 * | 11/2006 | Rajanala et al. ............... 717/105 |
| 2006/0294452 A1 | 12/2006 | Matsumoto |
| 2007/0006206 A1 | 1/2007 | Dhanjal |
| 2007/0006327 A1 | 1/2007 | Lal et al. |
| 2007/0050401 A1 | 3/2007 | Young |
| 2007/0055056 A1 * | 3/2007 | Dhanjal et al. ................. 715/700 |
| 2007/0055943 A1 * | 3/2007 | McCormack et al. ........ 715/746 |
| 2007/0061306 A1 | 3/2007 | Pell |
| 2007/0061307 A1 | 3/2007 | Hartwell |
| 2007/0061308 A1 | 3/2007 | Hartwell |
| 2007/0061705 A1 | 3/2007 | Ammerlaan |
| 2007/0083813 A1 | 4/2007 | Lui et al. |
| 2007/0094597 A1 * | 4/2007 | Rostom ........................ 715/700 |
| 2007/0094608 A1 * | 4/2007 | Getsch ......................... 715/762 |
| 2007/0106951 A1 | 5/2007 | McCormack |
| 2007/0143671 A1 | 6/2007 | Paterson |
| 2007/0156519 A1 * | 7/2007 | Agassi et al. ................. 705/14 |
| 2007/0179841 A1 * | 8/2007 | Agassi et al. ................. 705/14 |

| | | | |
|---|---|---|---|
| 2007/0185826 | A1 | 8/2007 | Brice |
| 2007/0234290 | A1* | 10/2007 | Ronen et al. ............... 717/120 |
| 2007/0240057 | A1 | 10/2007 | Satterfield |
| 2007/0260996 | A1 | 11/2007 | Jakobson |
| 2007/0279417 | A1 | 12/2007 | Garg |
| 2007/0283287 | A1* | 12/2007 | Taylor et al. ............... 715/769 |
| 2007/0300168 | A1 | 12/2007 | Bosma |
| 2008/0034304 | A1 | 2/2008 | Feuerbacher |
| 2008/0040682 | A1 | 2/2008 | Sorenson |
| 2008/0077571 | A1 | 3/2008 | Harris |
| 2008/0141156 | A1* | 6/2008 | Reik et al. .................. 715/771 |
| 2008/0178110 | A1 | 7/2008 | Hill |
| 2008/0209316 | A1 | 8/2008 | Zandstra |
| 2008/0263462 | A1* | 10/2008 | Mayer-Ullmann et al. ... 715/762 |
| 2009/0007003 | A1 | 1/2009 | Dukhon |
| 2009/0031295 | A1* | 1/2009 | Zhao et al. .................. 717/172 |
| 2009/0064090 | A1* | 3/2009 | Anonsen et al. ............ 717/104 |
| 2009/0083656 | A1 | 3/2009 | Dukhon |
| 2009/0100009 | A1 | 4/2009 | Karp |
| 2009/0163183 | A1 | 6/2009 | O'Donoghue et al. |
| 2009/0205013 | A1* | 8/2009 | Lowes .......................... 726/1 |
| 2009/0217192 | A1 | 8/2009 | Dean |
| 2009/0217263 | A1* | 8/2009 | Gebhart et al. ............... 718/1 |
| 2009/0222763 | A1 | 9/2009 | Dukhon |
| 2009/0249339 | A1 | 10/2009 | Larsson |
| 2009/0259950 | A1* | 10/2009 | Sullivan et al. ............ 715/762 |
| 2010/0146478 | A1* | 6/2010 | Head et al. .................. 717/101 |
| 2011/0296322 | A1 | 12/2011 | Dhanjal et al. |
| 2011/0307798 | A1* | 12/2011 | Lezama Guadarrama et al. ............................ 715/744 |

FOREIGN PATENT DOCUMENTS

| | | |
|---|---|---|
| EP | 1 077 405 A2 | 2/2001 |
| EP | 1 462 999 A2 | 9/2004 |
| EP | 1 542 133 A2 | 6/2005 |
| JP | 2004-512578 | 4/2004 |
| KR | 10-2002-0004723 | 1/2002 |
| KR | 10-2005-0023805 A | 3/2005 |
| KR | 10-2005-0036702 A | 4/2005 |
| KR | 10-200809921262 | 3/2008 |
| WO | WO 03/003240 A2 | 1/2003 |
| WO | WO 2005/103900 | 11/2005 |
| WO | WO 2007/027737 A1 | 3/2007 |

OTHER PUBLICATIONS

"User Interface Architecture," Data Master 2003, 2 pages.
Kim et al., "Migrating Legacy Software Systems to CORBA based Distributed Environments through an Automatic Wrapper Generation Technique," http://www.cs.colostate.edu/~bieman/Pubs/KimBieman00.pdf, accessed on Jan. 28, 2009, 6 pages.
Selca, Viki "Customizing the Office Fluent User interface in Access 2007," Microsoft Corporation, Dec. 2006, 22 pages.
U.S. Appl. No. 12/414,317, filed Mar. 30, 2009, entitled "Scope-Based Extensibility for Control Surfaces".
U.S. Appl. No. 12/331,451, filed Dec. 10, 2008, entitled "Multi-Layered Storage and Management of Software Components".
U.S. Appl. No. 13/102,633, filed May 6, 2011 entitled "Markup Based Extensibility for User Interfaces".
U.S. Official Action dated Jun. 7, 2011 in U.S. Appl. No. 12/059,644.
Australian Office Action cited in Appln. No. 2006284908 dated Oct. 21, 2010.
Chinese Second Office Action cited in Appln. No. 200680030421.2 dated Oct. 29, 2010.
U.S. Official Action in U.S. Appln. No. 11/217,071 mailed Mar. 22, 2011.
Chinese Office Action in Application No. 200980112454.5 dated Aug. 26, 2011, 9 pages.
International Search Report in Application No. PCT/US2011/037458 dated Feb. 9, 2012, 9 pages.
Japanese Notice of Rejection cited in Application No. 2008-529218 dated Dec. 16, 2011, 3 pages.
U.S. Official Action in U.S. Appl. No. 11/217,071 dated Jan. 17, 2012, 24 pages.
U.S. Official Action in U.S. Appl. No. 12/059,644 dated Jan. 25, 2012, 16 pages.
"About Google Desktop Search", http://www.desktop.google.com/about.html, Oct. 15, 2004, 8 pages.
"Convert to Word 2007," http://www.regencytraining.com/word-2007-conversion.html, Regency Training and Consulting, 2 pages (Date Printed Apr. 21, 2008).
"Creating Charts: An Introduction," Excel for Chemists: A Comprehensive Guide, E. Joseph Billo. http://www.ahut.edu.cn/yxsz/ahk/Teaching/Excel%for%20Chernists/ChQ2.pdf, copyright 2001.
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"External Style Sheets," http://www.webreference.com/html/tutorial5/9.html, Aug. 20, 1998, 3 pgs.
"ID & Class Selectors, Pseudoclasses," http://www.webreference.com/html/tutorial5/6.html, Aug. 20, 1998, 3 pgs.
"Inter-Widget Communication," http://web.mit.edu/6.115/www/miscfiles/amulet/amulet-help/IWC.htm, 6 pages (Feb. 13, 2007).
"Lookout", http://www.lookoutsoft.com, Apr. 22, 2005, 20 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Microsoft Enters Desktop Search Fray", http://www.internetnews.com/ent-news/article.php/3447331, Dec. 13, 2004, 5 pages.
"Microsoft Outlook 2000: Introduction to Calendar," Version Mar. 25, 2002, http://www.uakron.edu/its/learning/training/docs/Calendar032502.pdf, pp. 1-52.
"Primary Windows," Accessed at http://www-03.ibm.com/servers/eserver/iseries/navigator/guidelines/primary.html on Feb. 23, 2007, 23 pgs.
"Separate Structure and Presentation," http://www.webreference.com/html/tutorial5/1.html, Aug. 20, 1998, 4 pgs.
"TeeChart for .NET Charting Control," Steema Software; accessed at: http://www.teechart.net/; accessed on Jan. 11, 2006.
"The Style Attribute and CSS Declarations," http://www.webreference.com/html/tutorial5/2, Aug. 20, 1998, 4 pgs.
"The Style Element & CSS Selectors," http://www.webreference.com/html/tutorial5/4.html, Aug. 20, 1998, 3 pgs.
"The Technology in Document and Check Security," http://www.securedoc.in/thetechnology.htm, 7 pages (Date Printed Apr. 21, 2008).
"What's Hot in Internet Services?" http://www.webreference.com/html/tutorial5/3, Aug. 20, 1998, 3 pgs.
"Windows Desktop Search". Http://kunal.kundale.net/reviews/wds.html, Jul. 10, 2005, 7 pages.
"Yahoo to test desktop search", http://news.com.com/yahoo+to+test+desktop+searcach/2100-1032_3-5486381.html, Dec. 9, 2004, 6 pages.
"Managing the Code Editor and View" Microsoft Corporation, http://msdn.microsoft.com/en-us/library/z01zks9a(VS.71).aspx, 2008.
"Omni Web Help," Omni Group, 2004, http://www.omnigroup.com/documentation/omniweb/browser/tabs.html, 2 pages.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
Ando, R. et al., "Visualization-enabled multi-document summarization by Iterative Residual Rescaling," Natural Language Engineering, vol. 11, No. 1, pp. 67-86 (Mar. 2005) (2 page Abstract).
Andrew Dwelly, "Functions and Dynamic User Interface," 1989, ACM, pp. 371-381.
Becker et al., "Virtual Folders: Database Support for Electronic Messages Classification," Pontificia Universidade Catolica do Rio Grande do Sul, Porto Alegre, Brazil, pp. 163-170.

Berliner E.M. et al., "Microsoft Office 2003", Feb. 24, 2004, pg. 39-40, 120-124, 175-177, 233-234 [D1].

Berliner E.M. et al., "Microsoft Office 2003", Feb. 24, 2004, pg. 173-178 [D2].

Bill Dyszel, Microsoft Outlook 2000 for Windows for Dummies, Copyright 1999, pp. 82-86, 102-103, 141,143.

Bos, B, "Re: A proposal for addition to HTML 3.0: Frames," http://www.nyct.net/~aray/htmlwg/95q3/1141.html, 5 pages (Sep. 21, 1995).

Boyce, "Microsoft Outlook Inside Out," 2001, pp. 133, 134, 721-728.

Boyce, "Microsoft Outlook Inside Out," 2001, pp. 67, 68, 109, 110, 230, 231, 310, 316-318, 798.

Budinsky et al., "WebSphere Studio Overview," http://researchweb.watson.ibm.com/journal/sj/432/budinsky.html, May 6, 2004, 25 pgs.

Camarda, Using Microsoft Word 97, copyright 1997, QUE Corporation, pp. 412, 869.

Charles Rich et al., "Adding a Collaborative Agent to Graphical User Interfaces," 1996, ACM, pp. 21-30.

Charles Rich et al., "Segmented Interaction History in a Collaborative Interface Agent," 1997, ACM, pp. 23-30.

Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.

Clifton, The Application Automation layer—Using XML to Dynamically Generate GUI Elements—forms and controls, The Code Project, Jun. 2003, pp. 1-37.

de Candussio, N., "Common GUI Features Report," *Herschel CSDT Meeeting*, pp. 1-21 (Sep. 2007).

European Office Action mailed Mar. 9, 2009, Application No. 06790087.8.

European Search Report mailed Dec. 2, 2008, having Application No. EP 06 79 0087.

Find any file or email on your PC as fast as you can type!, http://www.x1.com, 2003, 1 page.

FrontPage 11 Beta Layperson's Specification, Copyright 2002, Microsoft Corporation, 12 pages.

Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.

Goldberg et al., "Using Collaborative Filtering to Weave an Information Tapestry," Communication of the ACM, vol. 35, No. 12, pp. 61-70, Dec. 1992.

Gordon Kurtenbach et al., "The Hotbox: Efficient Access to a Large Number of Menu-items," ACM, 1999, pp. 231-237, May 1999.

Gordon Padwick, Using Microsoft Outlook 2000, Que, Sp. Ed., May 1999, 5 pp.

Habraken, Microsoft Office XP 8 in 1, published Jun. 5, 2001, http://proquest.safaribooksonline.com/0789725096/, 12 pp.

Halvorson et al., "Microsoft Office XP Inside Out," 2001, pp. 1005-1009, 1015, 1023-1028, 1036-1039, 1093.

Halvorson et al., "Microsoft Office XP Inside Out," 2001, pp. 4, 5, 10, 11, 70-74, 281-288, 1010-1014.

Hepfner, Troy, "New SOCET CXP Interface Improves Usability," Sep. 2008, http://www.socetset.com.gxpmosaic/?p=95, 4 pages.

http://www.webreference.com/html/tutorial5/5.html, Aug. 20, 1998, 3 pgs.

http://www.webreference.com/html/tutorial5/7.html, Aug. 20, 1998, 3 pgs.

http://www.webreference.com/html/tutorial5/8.html, Aug. 20, 1998, 2 pgs.

International Search Report and Written Opinion mailed Jan. 9, 2007, Application No. PCT/US2006/033809.

International Search Report mailed Aug. 7, 2009, Application No. PCT/US2009/034618.

Jane Dorothy Calabria Burke, Ten Minute Guide to Lotus Notes 4.6, Publication date: Dec. 23, 1997, 2 pgs.

Khare et al., "The Origin of (Document) Species," University of California, 1998, 9 pgs.

Krill, P., "Microsoft's Ribbon Interface Draws Frowns, Smiles," *InfoWorld*, http://www.infoworld.com/article/08/03/04/10NF-microsoft-fluentui_1.html, 3 pages (Mar. 4, 2008).

Lisa K. Averett; Joshua R. Knisley; Mark A. Marvin; IIAITI: Projecting Tactical Network and Systems Management; 1995 IEEE pp. 906-910.

Liu et al., "Continual Queries for Internet Scale Event-Driven Information Delivery," IEEE Transactions on Knowledge and Data Engineering, vol. 11, Issue 1, pp. 610-628, 1999.

Louw, et al.; "*Extensible Web Browser Security*"; http://www.cs.uic.edu/~venkat/research/papers/extensible-browser-dimva07.pdf; pp. 1-20.

M. Williams, "Programming Windows NT4: Unleashed," Sams Publishing, Indianapolis, 1996, pp. index & 167-185.

Marsh, Bruce, Integrating Spreadsheet Templates and Data Analysis Into Fluid Power Instruction, Journal of Industrial Technology, vol. 16, No. 4, Aug.-Oct. 2000. http://www.nait.org/jit/Articles/marsh071200.pdf.

Marshall School of Business, Workshop 1—Introduction to Outlook & E-mail, Apr. 6, 2000, pp. 1-11.

Marshall School of Business: "Workshop IV—Calendar," http://www.marshall.usc.edu/computing/PDF_Files/Outlook/Workshop4, PDF, Apr. 10, 2000, pp. 1-4.

Microsoft Office 11 Beta Layperson's Specification, Copyright 2002, Microsoft Corporation, 28 pages.

Microsoft Office 2003, Microsoft Office Professional Edition 2003, Microsoft Corporation, 10 pages.

Microsoft Office Word 2003, Part of Microsoft Office Professional Edition 2003, 1983-2003 Microsoft Corporation, 5 pp.

Microsoft Office Word 2003, Part of Microsoft Office Professional Edition 2003, 1983-2003 Microsoft Corporation, screen shot 1, 1 pp.

Microsoft Press, Microsoft Computer Dictionary, Microsoft Press, Fifth Edition, 2002, pp. 374, 382.

Microsoft Publisher 11 Beta Layperson's Specification, Copyright 2002, Microsoft Corporation, 13 pages.

Microsoft Windows XP Professional, Version 2002, Service pack 2, 3 pgs.

Microsoft XDocs Beta Layperson Specification, Copyright 2002, Microsoft Corporation, 3 pages.

Nielsen, Jacob. "Tabs, Used Right," Alertbox, Sep. 17, 2007, http://www.useit.com/alertbox/tabs.html, 6 pages.

Office 11 Beta Letter, Copyright 2002, Microsoft Corporation, 6 pages.

Oracle Discoverer Desktop User's Guide; 10g (9.0.4) for Windows; Part No. B10272-01; published 2003; http://download-uk.oracle.com/docs/ed/B12166_01/bi/B10272_01/3graph.htm; pp. 1-18.

Padwick, Gordon "Using Microsoft Outlook 2000," 1999 Que Publishing, pp. 530-533.

Parry; "*CREWS: A Component-Driven, Run-Time Extensible Web Service Framework*"; http://eprints.ru.ac.za/74/01/Parry-MSC.pdf; Dec. 2003; 103 Pgs.

Perronne et al. "Building Java Enterprise Systems with J2EE", Publisher: Sams, Pub Date: Jun. 7, 2000 (pp. 1-8).

Pogue, David. "Windows XP Home Edition: The Missing Manual," O'Reilly, 1st Edition, May 1, 2002, pp. 37, 38, 41.

Raman, "Cascaded Speech Style Sheets," 1997, 7 pgs.

Rice, F, "Customizing the 2007 Office System Document Inspector," http://msdn2.microsoft.com/en-us/library/aa338203(d=printer).aspx, 10 pages (May 2006).

Riggsby et al., "Mastering Lotus Notes and Domino 6," 2003, pp. 135-139.

Riggsby et al., "Mastering Lotus Notes and Domino 6," 2003, pp. 135-138, 607-612.

Riggsby, McCoy, Haberman and Falciani, "Mastering Lotus Notes and Domino 6." 2003, pp. 18, 22, 33-35, 47, 122, 123, 215-241, 378.

Schumaker, "User Interface Standards," http://msdn2.microsoft.com/en-us/library/aa217660(office.11.d=printer).aspx, Sep. 2001, 5 pgs.

Screen Dumps Microsoft Corporation, Microsoft Office Professional Edition 2003, 4 pp.

Screen Dumps Microsoft Corporation, Microsoft Office Professional Edition 2003, 5 pp.

Screen Dumps of Microsoft Outlook (1999, pp. 1-3).

Screendumps—Microsoft Office Outlook, Microsoft Office Outlook Professional Edition 2003, Microsoft Corporation, 2 pages.

Screendumps—Microsoft Office, Microsoft Corporation, Microsoft Office Professional Edition 2003, 13 pages.

Screendumps—Microsoft Office, Microsoft Office Professional Edition 2003, Microsoft Corporation, 10 pages.

Slovak, Ken. "Absolute Beginner's Guide to Microsoft Office Outlook 2003." 2003, Que Publishing, pp. 237-241.

U.S. Official Action dated Jun. 10, 2009 in U.S. Appl. No. 11/154,278.

U.S. Official Action dated Mar. 30, 2010 in U.S. Appl. No. 11/217,071.

U.S. Official Action dated Nov. 13, 2009 in U.S. Appl. No. 11/154,278.

U.S. Official Action dated Nov. 25, 2008 in U.S. Appl. No. 11/154,278.

U.S. Official Action dated Sep. 15, 2009 in U.S. Appl. No. 11/217,071.

U.S. Appl. No. 12/059,644, filed Mar. 31, 2008 entitled "Associating Command Surfaces with Multiple Active Components".

U.S. Appl. No. 11/154,278, filed Jun. 16, 2005 entitled "Cross Version and Cross Product User Interface Compatibility".

U.S. Appl. No. 11/217,071, filed Aug. 30, 2005 entitled "Markup Based Extensibility for User Interfaces".

Word 2002, Chapter 14; Paradigm Publishing Inc., copyright 2002; http://www.emcp.com/tech_tutorials/sig_irc/Signature_Word_Chapter_14.ppt, 21 pp.

U.S. Official Action dated Apr. 19, 2012 in U.S. Appl. No. 13/102,633.

\* cited by examiner

MERGING MODIFICATIONS TO USER INTERFACE COMPONENTS WHILE PRESERVING USER CUSTOMIZATIONS

BACKGROUND

Businesses frequently require software systems that are tailored to their particular industries. For example, dentists may need software systems that help schedule appointments and send bills to insurance companies. In another example, real estate agents may need software systems that help maintain client contact and help generate purchase agreements.

Many of these business-specific software systems require the same general types of functionality. In the previous examples, both the software systems for dentists and the software systems for real estate agents can require database services, web access services, and client contact management services. A service is a program or routine that provides support to other programs.

Re-creating the software code for these common types of functionality for every business-specific software system would be time consuming and expensive. Accordingly, platform applications have been developed. The platform applications provide these common types of functionality. For example, a platform application can provide database services and basic client contact management services.

Other software developers then use such platform applications as platforms upon which to develop software "solutions." These solutions can add functionality to the platform applications in order to address the needs of businesses in specific industries. For example, a solution can use a client contact management service and a database service provided by a platform application to create a solution tailored to the needs of dental professionals. Businesses can install one or more such solutions on the platform applications.

In addition to adding functionality to platform applications, solutions can modify the user interfaces of platform applications. For instance, a solution can add buttons or forms to the user interface of a platform application. A user interface is a portion of a program with which a user interacts.

Furthermore, in some circumstances, businesses are able to further customize the user interface of the platform application. For example, a business can customize the user interface of the platform application to hide a button or re-label menu items. In another example, a business can customize the user interface of the platform application to add or remove fields from a form. Typically, such customizations are lost whenever the business installs, uninstalls, or updates solutions that build upon the platform application. Because businesses can spend considerable time and resources making the customizations to the user interface, reapplying the customizations can be inconvenient and expensive.

SUMMARY

An application displays a user interface (UI) component. A client can apply customizations to this UI component. After the client applies customizations to the UI component, the client modifies a solution set containing solutions that modify the UI component. In various embodiments, the client can modify the solution set in various ways. For example, the client can add solutions to the solution set, remove solutions from the solution set, update solutions already in the solution set, or otherwise modify the solution set. After the client modifies the solution set, the application displays a new version of the UI component. Modifications provided by the solutions are applied to the new version of the UI component. In addition, the customizations remain applied to the UI component without the client manually re-applying the customizations to the UI component.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
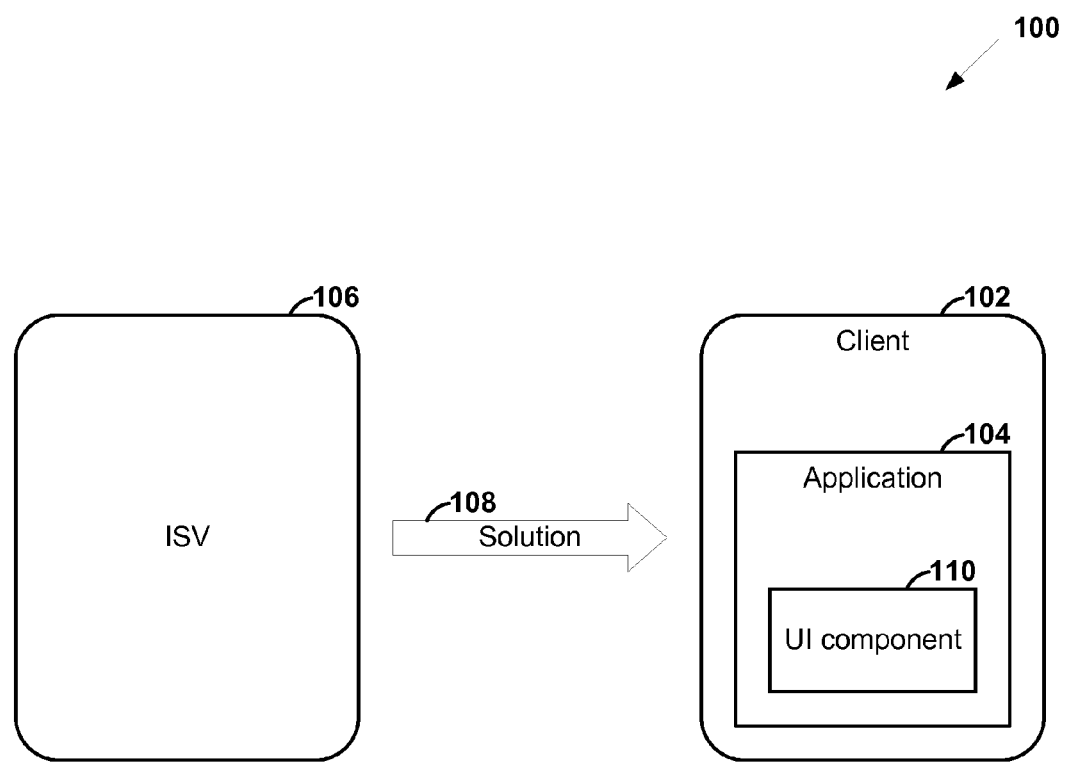
FIG. 1 is a block diagram illustrating an example system.

FIG. 1 is a block diagram illustrating an example system 100. As illustrated in the example of FIG. 1, the system 100 includes a client 102. The client 102 is an entity, such as business entity (e.g., a corporation, partnership, company, etc.), a governmental entity (e.g., a department, bureau, agency, etc.), a non-business entity (e.g., a foundation, a non-profit corporation, etc.), or an individual person.

The client 102 uses an application 104. An application is a program designed to assist in the performance of a specific task. In various embodiments, the application 104 can be various types of applications. For example, in some embodiments, the application 104 can be a Customer Relationship Management (CRM) application, such as a MICROSOFT DYNAMICS® application. In other embodiments, the application 104 can be a word processing application, a spreadsheet application, a web application, a note taking application, or another type of application.

The application 104 is a platform application. In its initial form, the application 104 can provide some of the functionality needed by the client 102. However, in its initial form, the application 104 might not provide all the functionality needed by the client 102. For example, the client 102 may be a real estate agency. In this example, the application 104 provides features for managing client contact information and for storing documents, but does not provide any special features related to the real estate business.

An independent software vendor (ISV) 106 produces a solution 108 that extends the functionality of the application 104. For example, the solution 108 can extend the functionality of the application 104 to provide special features related to the real estate business. For instance, in this example, the solution 108 can extend the functionality of the application 104 to provide features for managing information about properties that the real estate agency is selling. If the client 102 wants the additional functionality provided of the solution 108, the client 102 can obtain and install the solution 108.

In some circumstances, the additional functionality provided by the solution 108 may still not be sufficient to meet the needs of the client 102. For example, the client 102 could specialize in buying and selling condominiums. In this example, the additional functionality of the solution 108 may not be sufficient to capture some nuances of the condominium business. Accordingly, the client 102 could obtain and install another solution (not shown) that provides functionality in addition to that provided by the application 104 and the solution 108. For example, the other solution could build upon the functionality provided by the solution 108 to provide features for managing condominium association documents. Thus, the functionality of the application 104 can be extended multiple times by multiple solutions.

In order to extend the functionality of the application 104, the solution 108 can modify a user interface (UI) component 110 of the application 104. In some embodiments, the UI component 110 is a discrete component within the UI of the application 104. For example, the UI component 110 can be a form. A form is a structured document with spaces reserved for entering information. In another example, the UI component 110 is a pick list. A pick list is a list of items from which a user can select. In yet another example, the UI component 110 can be a control ribbon component. A control ribbon component is a UI component in which a set of toolbars are placed on tabs in a tab bar. In yet another example, the UI component 110 is a toolbar. A toolbar is a row or strip of clickable icons or buttons that activate functions. In yet another example, the UI component 110 is a site map. A site map is a list of links to other UI components. For instance, a site map can include a list of forms or a list of links to UI components associated with various tasks. In other embodiments, the UI component 110 is the complete UI of the application 104.

Installation of the solution 108 can modify the UI component 110 in various ways. For example, the UI component 110 can be a form. In this example, installation of the solution 108 can modify the UI component 110 to include more or fewer fields in the form or to rearrange the fields in the form. In another example, installation of the solution 108 can modify the UI component 110 to include additional elements, such as buttons, drop-down boxes, text entry fields, menus, menu items, or other types of controls. In a graphical user interface, a control is an object in the screen that can be manipulated by a user to perform an action. Elements are things that appear in user interfaces, such as text, controls, pictures, links, regions, columns, backgrounds, etc. In another example, the solution 108 can modify the UI component 110 to remove elements from the UI component 110. In yet another example, the solution 108 can modify the UI component 110 to change the content or position of elements in the UI component 110.

In some circumstances, the client 102 may like the additional functionality provided by the solution 108, but might not like how the UI component 110 appears after the solution 108 is installed. For example, the client 102 might find it inconvenient that a particular field in a form is at the bottom of the form instead of the top of the form. In another example, the client 102 might want to put its corporate logo in the UI component 110 in order to make the application 104 appear like it was built just for the client 102.

Accordingly, the application 104 allows the client 102 to customize the UI component 110. For example, the application 104 allows the client 102 to hide unneeded controls in the UI component 110, change the names or labels of controls in the UI component 110, rearrange elements in the UI component 110, add images to the UI component 110, and so on. In addition to being able to customize aspects of the UI component 110 that were originally provided by the application 104, the client 102 can also customize aspects of the UI component 110 that were modified by one or more solutions. For example, the solution 108 can add an additional button to the UI component 110. In this example, the client 102 might not find this additional button useful and can customize the UI component 110 to hide this additional button.

In some instances, the client 102 can invest a considerable amount of time and money in customizing the UI component 110 to its particular wants and needs. Accordingly, the client 102 could get frustrated if the client's customizations to the UI component 110 were lost every time the client 102 modified the set of installed solutions (i.e., the solution set). For instance, it could be frustrating if the client's customizations to the UI component 110 were lost every time the client 102 installed, updated, or uninstalled a solution. To avoid the need to manually apply the customizations to the UI component 110 again, the client 102 simply might not install additional solutions or could feel locked-in to a particular solution. This could suppress the marketplace for solutions to the detriment of the ISV 106 and the client 102.

As described in this specification, the application 104 displays a customized version of the UI component 110. The customized version of the UI component 110 is a version of the UI component 110 to which client customizations have been applied. After modifications are made to the solution set, the application 104 displays a new customized version of the UI component 110. The new customized version of the UI component 110 is a version of the UI component 110 to which modifications provided by the solutions in the solution set are applied. Furthermore, client customizations remain applied to modified version of the UI component 110 without manually applying the applicable client customizations to the UI component 110.

Figure 2:
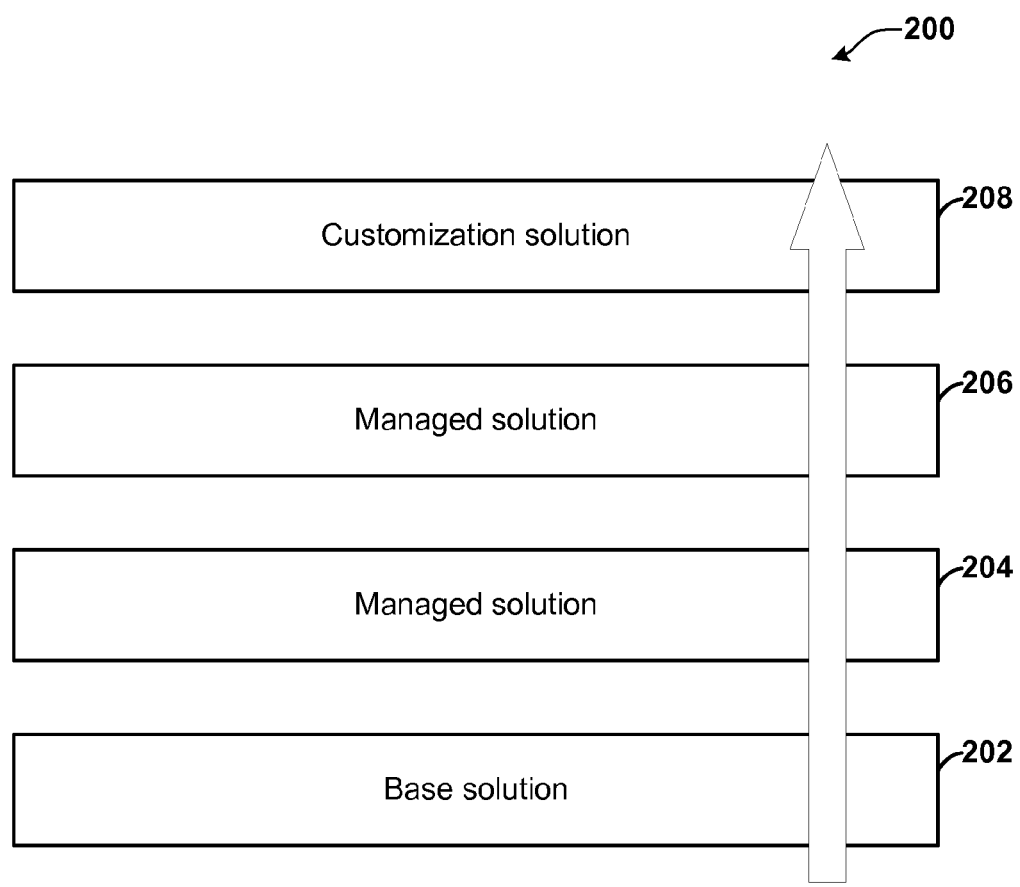
FIG. 2 is a block diagram illustrating an example solution set.

FIG. 2 is a block diagram illustrating an example solution set 200. As illustrated in the example of FIG. 2, the solution set 200 includes a base solution 202. The base solution 202 is provided by the application 104. The base solution 202 provides the initial functionality of the application 104 before any solutions are installed on the application 104.

The base solution 202 provides a base interface definition. The base interface definition is a file containing data that defines the content and layout of a base version of the UI component 110. A file is a complete, named collection of information. The base version of the UI component 110 is a version of the UI component 110 displayed when no solutions are installed on the application 104 and no client customizations have been applied to the UI component 110.

To define the content and layout of the base version of the UI component 110, the base interface definition includes data that describe the content and layout of the base version of the UI component 110. For example, the base interface definition can include data that indicate which controls are in the UI component 110 and where these controls are to be located within the UI component 110. In various embodiments, the base interface definition is formatted in various ways. For example, in some embodiments, the base interface definition is formatted as an Extensible Markup Language (XML) file.

In other embodiments, the base interface definition is formatted as a Standard Generalized Markup Language (SGML) file.

As illustrated in the example of FIG. 2, the solution set 200 also includes a managed solution 204 and a managed solution 206. The managed solution 204 and the managed solution 206 are solutions that extend the functionality of the base solution 202. For example, the managed solution 204 can extend the functionality of the base solution 202 to provide dental office appointment services. In this example, the managed solution 206 can extend the functionality of the managed solution 204 to enable dental office employees to bill insurance companies for dental appointments.

In this specification, the managed solutions 204 and 206 are referred to as "managed" solutions because the software code in these solutions is created and maintained (i.e., managed) by an entity other than the client 102. For example, the managed solution 204 and/or the managed solution 206 can be managed by the ISV 106 or another ISV.

When the managed solution 204 is installed, a modified interface definition is created by applying modifications provided by the managed solution 204 to the base interface definition. The modified interface definition defines a modified version of the UI component 110. For example, modifications can be applied to the base interface definition such that additional elements that were not included the base version of the UI component 110 are included the modified version of the UI component 110, such that elements in the base version of the UI component 110 are hidden in the modified version of the UI component 110, elements in the base version of the UI component 110 are renamed or repositioned in the modified version of the UI component 110, or otherwise.

When the managed solution 206 is installed, a further modified interface definition is created by applying modifications provided by the managed solution 206 to the modified interface definition. The further modified interface definition defines a further modified version of the UI component 110. For example, the additional changes can be applied to the modified interface definition such that elements are added to the modified version of the UI component 110, elements of the modified version of the UI component 110 are hidden, or elements of the modified version of the UI component 110 are otherwise modified.

Furthermore, as illustrated in the example of FIG. 2, the solution set 200 includes a customization solution 208. Conceptually, the customization solution 208 represents client customizations to the UI component 110. When the client 102 performs an action to customize the UI component 110, a customized interface definition is generated by applying changes to the further modified interface definition. The customized interface definition defines a customized version of the UI component 110. For example, the client customizations can be applied to the further modified version of the UI component 110 such that elements are added to the further modified version of the UI component 110, elements of the further modified version of the UI component 110 are hidden, or elements of the further modified version of the UI component 110 are otherwise modified.

In some embodiments, the application 110 manages the components in the component stack using a database system of a type described in U.S. patent application Ser. No. 12/331,451, filed Dec. 10, 2008, the entire content of which is hereby incorporated by reference.

Figure 3:
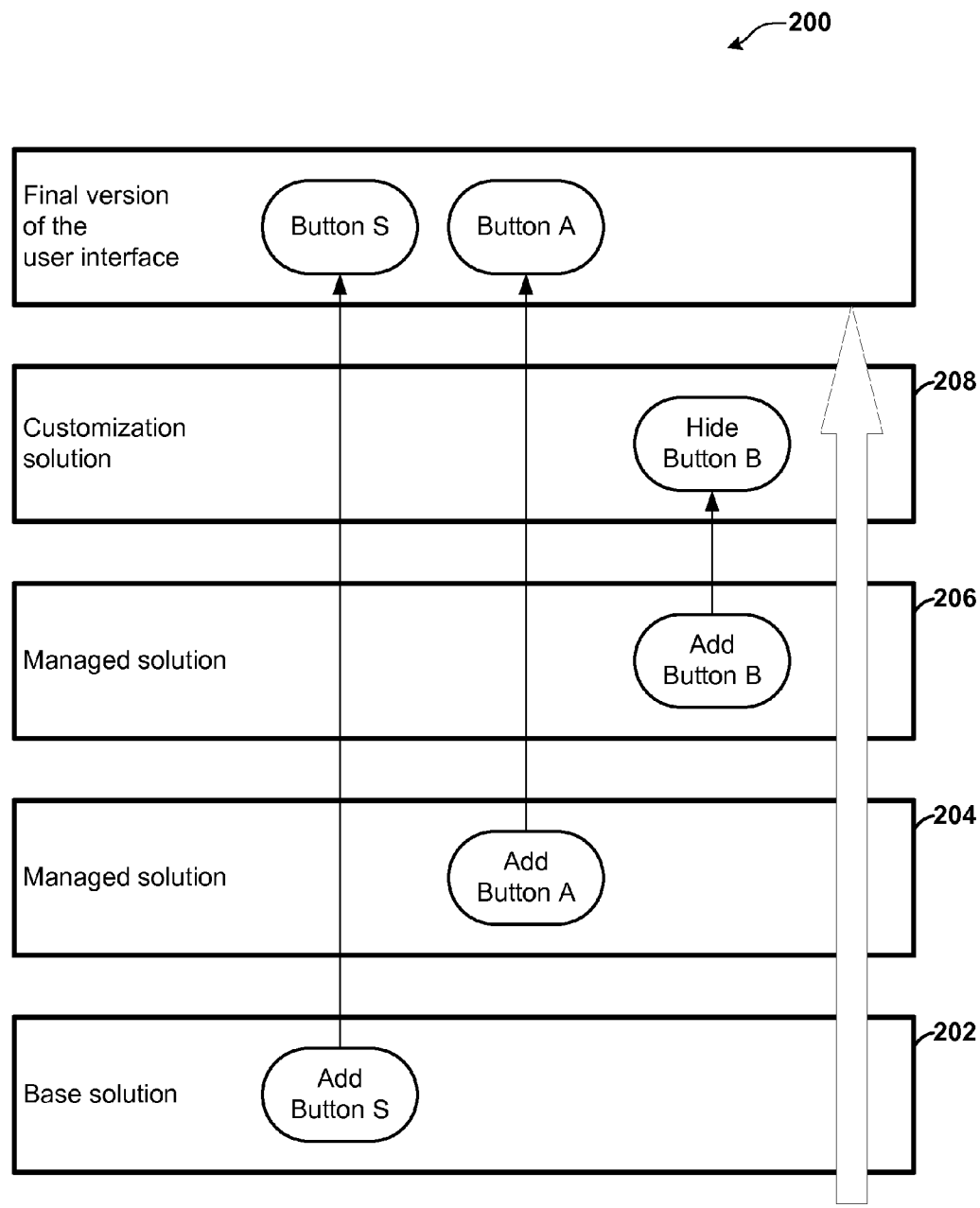
FIG. 3 is a block diagram illustrating example changes to a user interface component of an application caused by solutions in the solution set.

FIG. 3 is a block diagram illustrating changes to the UI component 110 caused by solutions in the solution set 200. As illustrated in the example of FIG. 3, the base solution 202 provides a base interface definition that defines the base version of the UI component 110 to include a button "S." The managed solution 204 provides for modifications to the base interface definition. Applying the modifications provided by the managed solution 204 results in a modified interface definition that defines a modified version of the UI component 110 that includes a button "A." Furthermore, the managed solution 206 provides modifications to the modified interface definition. Applying the modifications provided by the managed solution 206 results in a further modified interface definition that defines a further modified version of the UI component 110 that includes a button "B." The customization solution 208 provides for modifications to the further modified interface definition. Applying the modifications provided by the customization solution 208 results in a final interface definition that defines a final version of the UI component 110 in which the button "B" is hidden.

As illustrated in the example of FIG. 3, the final version of the UI component 110 includes the button "S" and the button "A," but not the button "B."

Figure 4A:
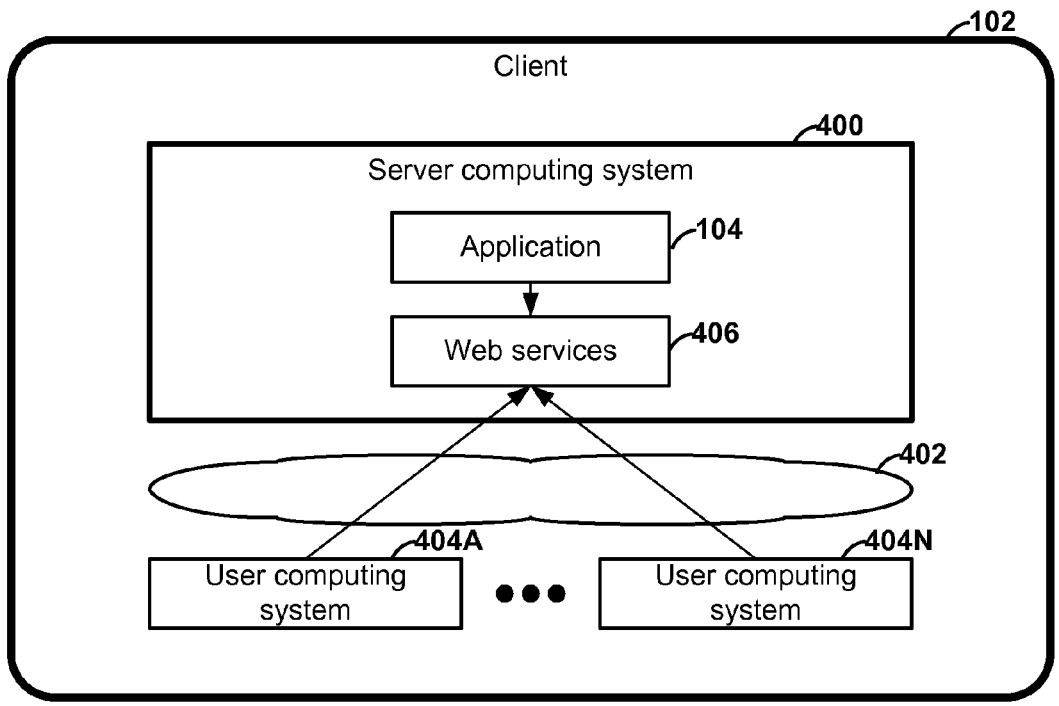
FIGS. 4A and 4B are block diagrams illustrating example details regarding a client.
Figure 4B:
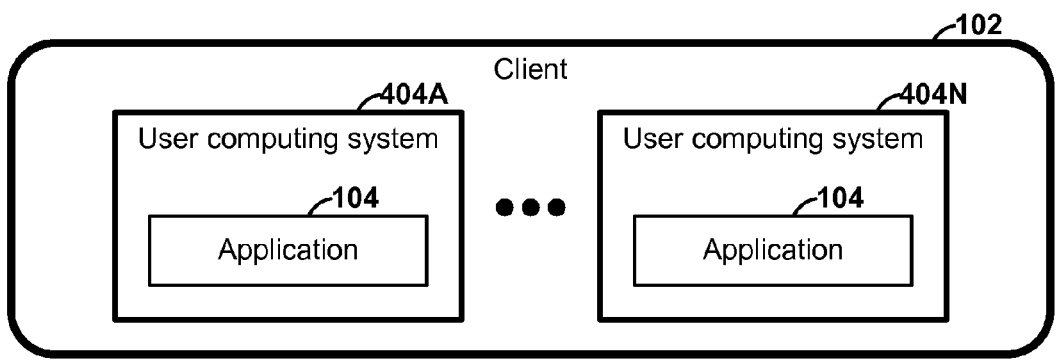

FIGS. 4A and 4B are block diagrams illustrating example details regarding the client 102. It should be appreciated that in other embodiments, the client 102 can include computing systems other than those illustrated in the examples of FIGS. 4A and 4B.

As illustrated in the example of FIG. 4A, the client 102 can include a server computing system 400, a network 402, and user computing system 404A through 404N (collectively, "user computing systems 404"). The server computing system 400 is a computing system that provides the application 104 and web services 406. Solutions are installed at the server computing system 400 and not at the user computing systems 404. The user computing systems 404 are computing systems used by users associated with the client 102. For example, employees of the client 102 can use the user computing systems 404.

The network 402 facilitates communication between the user computing systems 404 and the server computing system 400. In various embodiments, the network 402 is implemented in various ways. For example, in some embodiments, the network 402 is a local area network. In other embodiments, the network 402 is a wide area network, such as the Internet.

The user computing systems 404 exchange messages with the web services 406 via the network 402 in order to communicate with the application 104. Messages sent by the web services 406 to the user computing systems 404 can contain data that represents the UI component 110 of the application 104. Messages sent by the user computing systems 404 to the web services 406 include data that represent requests to interact with the UI component 110. The user computing systems 404 interpret this data to display the UI component 110 to the users of the user computing systems 404. In this way, the users of the user computing systems 404 can interact with the application 104 even though the application 104 is not actually running on the user computing systems 404.

FIG. 4B illustrates an alternate embodiment in which the client 102 includes the user computing systems 404, but does not necessarily include the network 402 or the server computing system 400. In the example of FIG. 4B, separate copies of the application 104 are installed on separate ones of the user computing systems 404. Solutions are installed separately on each of the user computing systems 404.

Figure 5:
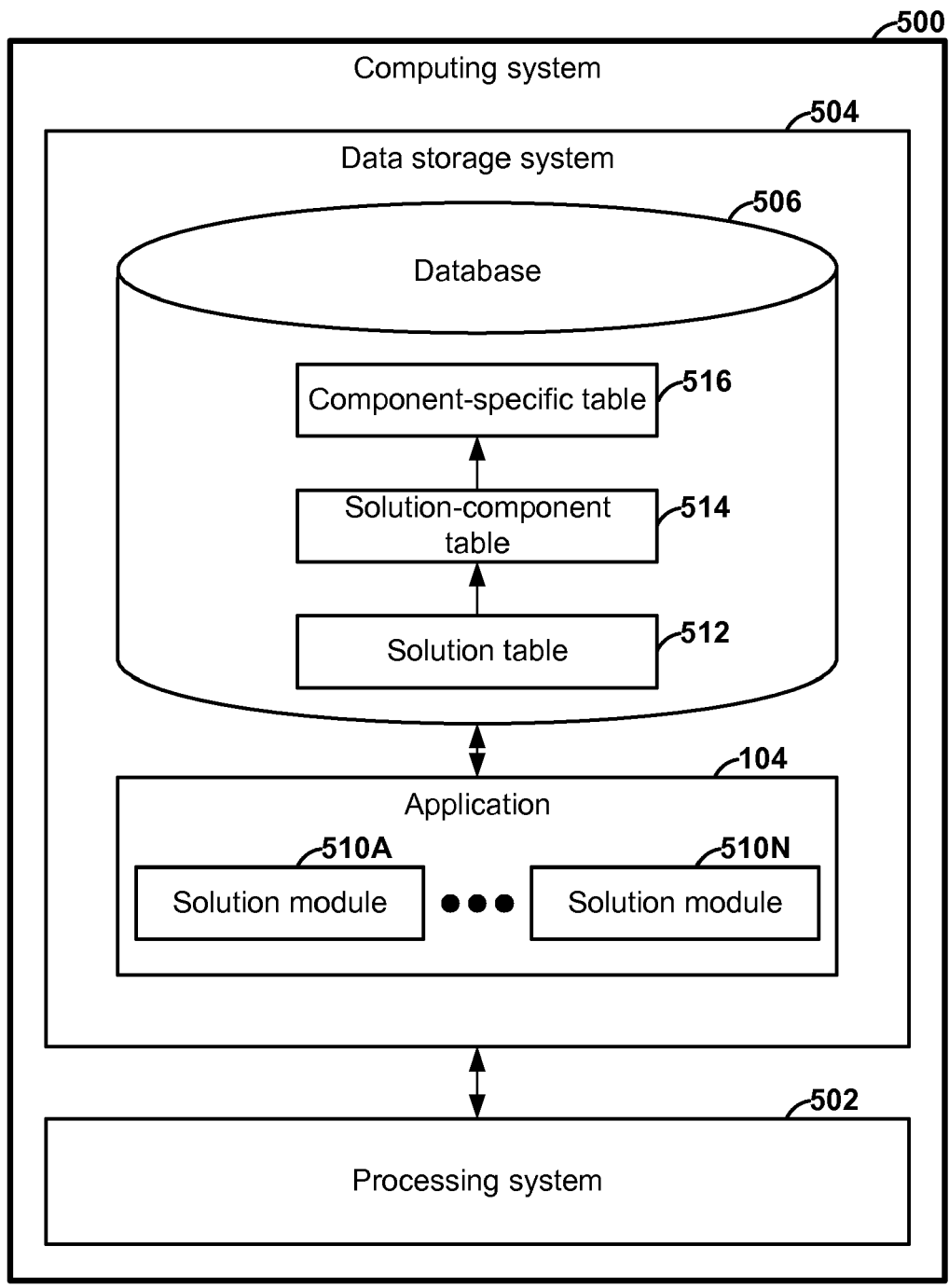
FIG. 5 is a block diagram illustrating an example computing system used by the client.

FIG. 5 is a block diagram illustrating example details regarding a computing system 500 used by the client 102. In various embodiments, the computing system 500 can be the server computing system 400 illustrated in the example of FIG. 4A, the user computing systems 404 illustrated in the example of FIG. 4B, or other computing systems used by the client 102.

As illustrated in the example of FIG. 5, the computing system 500 provides a processing system 502 and a data storage system 504. It should be understood that FIG. 5 illustrates a simplified view of the computing system 500. In actuality, the computing system 500 includes many other logical and physical parts.

The data storage system 504 stores data representing a database 506 and computer-readable instructions. When one or more processing units in the processing system 502 run these computer-readable instructions, the computer-readable instructions cause the computing system 500 to provide the application 104.

The application 104 includes a set of solution modules 510A through 510N (collectively, "solution modules 510"). Each of the solution modules 510 contains computer-readable instructions that, when run by the processing system 502, cause the application 104 to provide additional functionality associated with solutions. In various embodiments, the solution modules 510 can be built in various ways. For example, in some embodiments, one or more of the solution modules 510 comprise compiled high-level programming language code. Example high-level programming languages include C, C++, C#, Java, and so on. In another example, one or more of the solution modules 510 comprise interpreted programming language code, such as JavaScript, Perl, VBScript, and so on. In yet another example, one or more of the solution modules 510 can comprise a workflow application. A workflow application is a set of programs that aid in the tracking and management of activities in a project from start to finish.

In various embodiments, the database 506 can be implemented in various ways. For example, in some embodiments, the database 506 is implemented as a set of one or more flat files. In other embodiments, the database 506 is implemented as a relational database. The remainder of this specification discusses the database 506 as a relational database. However, it should be appreciated that in some embodiments, the database 506 is not implemented as a relational database.

As illustrated in the example of FIG. 5, the database 506 comprises a solution table 512, a solution-component table 514, and a component-specific table 516. Example types of tables include data structures characterized by rows and columns, with data occupying each cell formed by a row-column intersection. The solution table 512 includes an entry for each solution in the solution set. An entry in the solution table 512 for a solution can include various pieces of information about the solution. For example, an entry in the solution table 512 can include a name of a solution, a version number of the solution, a description of the solution, and a solution identifier for the solution.

The solution-component table 514 includes entries that relate solutions to solution components. A solution component is a part of a solution. The solution components of a solution can play various roles within the solution. For example, the solution components of a solution can include a workflow component that aids in the tracking and management a sale of a condominium. In this example, the solution components of the solution can also include a set of form components that enable users to input information relating to sales of condominiums. Furthermore, in this example, the solution components of the solution can include a control ribbon component that specifies changes to be applied to a control ribbon of the UI component 110.

Each entry in the solution-component table 514 includes a solution identifier field and a component identifier field. The solution identifier field indicates a solution identifier of a solution. The component identifier field indicates an identifier of a solution component of the solution. The solution-component table 514 can include multiple entries having the same solution identifier in the solution identifier field. In this way, the solution-component table 514 can specify the component identifiers of each of the solution components of the solutions.

The component-specific table 516 includes entries that contain information specific to a particular type of solution component. Although only the single component-specific table 516 is shown in the example of FIG. 5 for the sake of simplicity, the database 506 can include separate component-specific tables for each type of solution component used by solutions installed in the application 104.

For example, the component-specific table 516 can include information specific to components that modify a ribbon component of the UI component 110. In this example, each entry in the component-specific table 516 has a component identifier field and a change list field. In this example, the component identifier field specifies a component identifier. In this way, the application 104 can relate entries in the solution-component table 514 to entries in the component-specific table 516. In this example, the change list field specifies a change list. As described elsewhere in this specification in greater detail, a change list is a set of change items. Each of the change items specifies a change to be applied to an interface definition that defines a version of the UI component 110. Modifications to the UI component 110 can be provided by solutions in the change lists of the solutions.

In another example, the component-specific table 516 can include information specific to a form. In this example, each entry in the component-specific table 516 has a component identifier field and a difference descriptor field. The component identifier fields specify component identifiers. The difference descriptor fields contain difference descriptors. As described elsewhere in this specification in greater detail, a difference descriptor is a document that denotes differences between a source interface definition and a destination interface definition. Modifications to the UI component 110 can be provided by solutions in the difference descriptors of the solutions.

Figure 6:
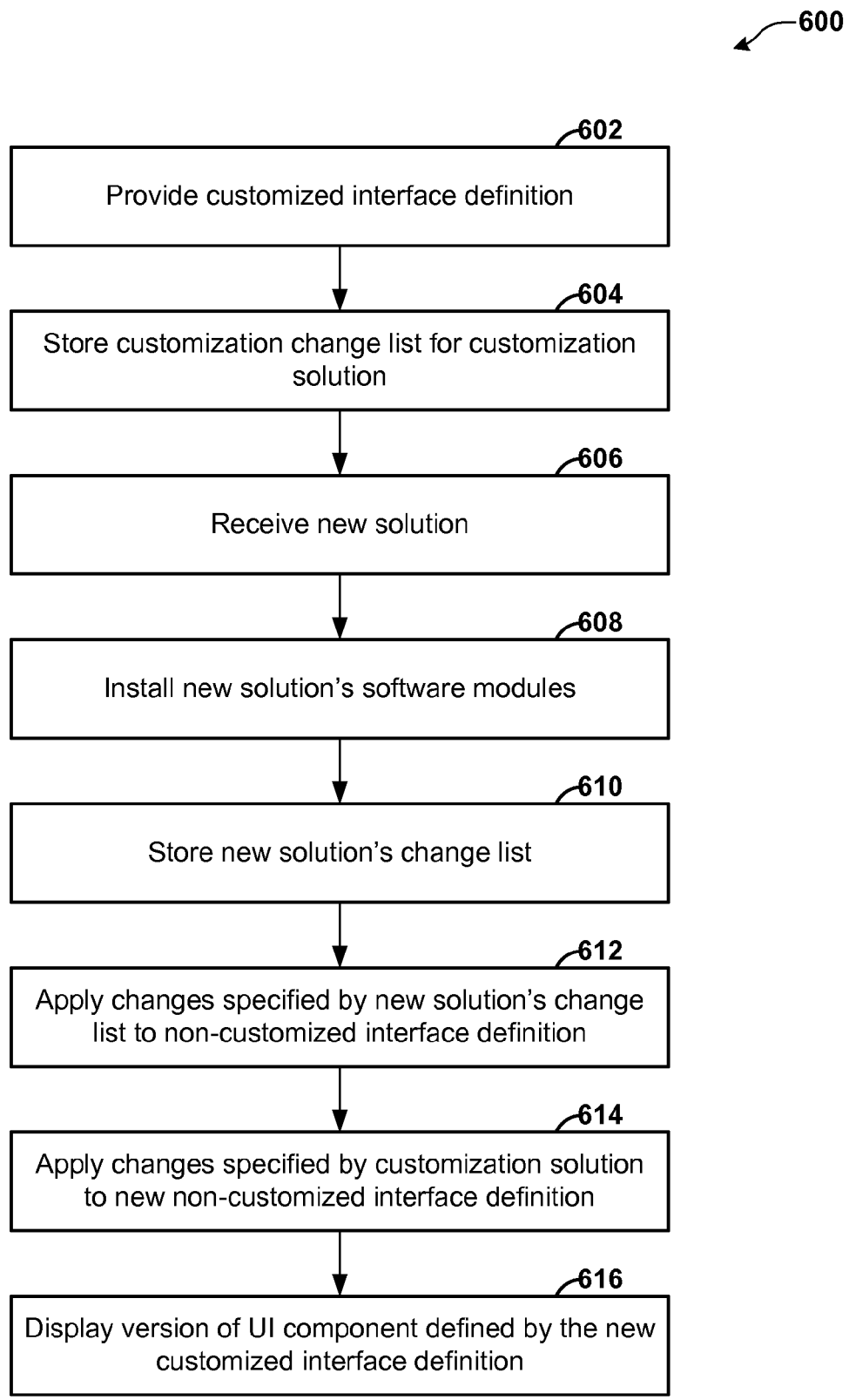
FIG. 6 is a flowchart illustrating an example operation to install a solution having a change list.

FIG. 6 is a flowchart illustrating an example operation 600 to install a solution that has a change list. As illustrated in the example of FIG. 6, a customized interface definition is provided (602). The customized interface definition defines a version of the UI component 110 to which client customizations have been applied. In addition, the application 104 stores a customization change list in the database 506 (604). The customization change list expresses client customizations. The customization change list comprises a set of change items associated with client customizations to the UI component 110. Each change item specifies a change to be applied to an interface definition. For example, the change list can include a change item that specifies that a particular control is to be hidden. In another example, the change list can include a change item that specifies that a particular element is to be added. In yet another example, the change list can include a change item that specifies that the label of a particular element is to be changed. Each time the client 102 customizes the UI component 110, the application 104 can update the change items in the customization change list.

Change items in change lists can refer to elements in the base interface definition (i.e., the interface definition provided by the base solution 202). Furthermore, change items in change lists can refer to elements in modified interface definitions. For example, a new solution can build upon another solution. In this example, a change item in a change list for the other solution can specify that a given element is to be added to the UI component 110. In this example, a change item in the change list for the new solution can specify that the given element is to be hidden.

The following is an example change list. This example change list includes only a single change item, denoted by "CustomAction" tags. This change item adds a new button to a control ribbon element "Mscrm.Form.{!EntityLogicalName}.MainTab.Save.Controls._children". XML code defining the new button is denoted by "Button" tags.

```
<RibbonDiffXml>
  <CustomActions>
    <CustomAction Id="MyISV.all.form.Close.CustomAction"
        Location="Mscrm.Form.{!EntityLogicalName}.-
        MainTab.Save.Controls._children"
            Sequence="45">
      <CommandUIDefinition>
        <Button Id="MyISV.{!EntityLogicalName}.form.Close.Button"
            Command="Mscrm.ClosePrimary"
            LabelText="$LocLabels:MyISV.all.Close.LabelText"
            ToolTipTitle="$LocLabels:MyISV.all.Close.LabelText"
            ToolTipDescription=
            "$LocLabels:MyISV.all.Close.ToolTip"
            TemplateAlias="c6"
            Image16by16="$webresource:Close16.png"
            Image32by32="$webresource:Close32.png" />
      </CommandUIDefinition>
    </CustomAction>
  </CustomActions>
  <Templates>
    <RibbonTemplates Id="Mscrm.Templates">
    </RibbonTemplates>
  </Templates>
  <CommandDefinitions />
  <RuleDefinitions>
    <TabDisplayRules />
    <DisplayRules />
    <EnableRules />
  </RuleDefinitions>
  <LocLabels>
    <LocLabel Id="MyISV.all.Close.LabelText">
      <Titles>
        <Title languagecode="1033"
            description="Close" />
      </Titles>
    </LocLabel>
    <LocLabel Id="MyISV.all.Close.ToolTip">
      <Titles>
        <Title languagecode="1033"
            description="Close this window." />
      </Titles>
    </LocLabel>
  </LocLabels>
</RibbonDiffXml>
```

In some embodiments, the client 102 can export client customizations for installation on other computing systems. In some embodiments, this can be accomplished by providing the customization change list to the other computing systems. For instance, in the example of FIG. 4B, the customization change list can be created at the user computing system 404A and then provided to the user computing systems 404B through 404N. In this way, the user computing systems 404B through 404N can have the same client customizations as the user computing system 404A.

Subsequently, the application 104 receives a new solution (606). In various embodiments, the application 104 can receive the new solution in various ways. For example, the application 104 can receive the new solution from one or more optical discs, magnetic disks, solid-state memory devices, or other computer-readable data storage media. In another example, the application 104 can receive the new solution from a wired or wireless network connection. The new solution comprises a set of solution components. The new solution's solution components can include one or more software modules and a change list for a new solution. Modifications to the UI component 110 are provided by the new solution in the new solution's change list.

After receiving the new solution, the application 104 installs the new solution's software modules (608). The new solution's software modules are sets of computer-readable instructions that, when run by the computing system 500, cause the application 104 to provide additional functionality. For example, a software module can be a set of computer-readable instructions that cause the application 104 to include features that would be useful to doctors' offices. In various embodiments, the application 104 performs various actions to install the new solution's software modules. For example, in the example embodiment of FIG. 5, the application 104 generates a new entry in the solution table 512 for the new solution and then generates new entries in the solution-component table 514 for the new solution's software modules. In this way, the application 104 can use the database 506 to find the new solution's software modules.

Next, the application 104 stores the new solution's change list (610). In various embodiments, the application 104 stores the new solution's change list in various ways. For example, in the example embodiment of FIG. 5, the application 104 creates a new entry in the solution-component table 514 and a new entry in the component-specific table 516. The entry in the solution-component table 514 specifies an identifier of the new solution and a component identifier. This entry in the component-specific table 516 specifies this component identifier and the new solution's change list.

Like the customization change list, the new solution's change list comprises a set of change items. Each change item specifies a change to be applied to an interface definition. For example, the new solution's change list can include a change item that specifies that a particular control is to be hidden. In another example, the new solution's change list can include a change item that specifies that a particular element is to be added. In yet another example, the new solution's change list can include a change item that specifies that the label of a particular element is to be changed.

After storing the change list for the new solution, the application 104 generates a new non-customized interface definition by applying the changes specified by the new solution's change list to a non-customized interface definition (612). The non-customized interface definition is an interface definition that defines a version of the UI component 110 that results from applying the modifications provided by the solutions to a base version of the UI component 110. In the context of FIG. 6, the non-customized interface definition is an interface definition generated by applying changes in each of the managed solutions change lists to a base interface definition in the order in which the managed solutions were installed. For example, if the new solution's change list includes a change item that indicates that a button is to be added to the UI component 110, the application 104 modifies the non-customized interface definition such that the non-customized interface definition defines a version of the UI component 110 that includes the button.

To apply the changes specified by a change list to an interface definition, the application 104 scans through the change items in the change list. For each change item in the change list that indicates the addition of an element into another element, the application 104 determines whether the other element exists in the interface definition. If the other element does not exist in the interface definition, the application 104 inserts the added element into an "orphan" element section of the UI component 110. If the other element exists in the interface definition, the application 104 adds the added element to the other element. For each change item in the change list that indicates the deletion of an element, the application 104 deletes the indicated element if the indicated element is in the interface definition. For each change item in the change list that indicates the modification of an element, the application 104 modifies the indicated element in a manner indicated by the change item, if the indicated element is in the interface definition.

After applying the changes specified by the new solution's change list, the application 104 generates a new customized interface definition by applying changes specified by the customization change list to the new non-customized interface definition (614). For example, the customization change list can include a change item that indicates that a button is to be hidden. Furthermore, in this example, the button is not hidden in the version of the UI component 110 defined by the new non-customized interface definition. In this example, the application 104 modifies the new non-customized interface definition such that the button is hidden in the version of the UI component 110 defined by the new customized interface definition.

After generating the new customized interface definition, the application 104 displays a version of the UI component 110 defined by the new customized interface definition (616). The version of the UI component 110 defined by the new customized interface definition is referred to herein as the new customized version of the UI component 110. In various embodiments, the application 104 displays the new customized version of the UI component 110 in various ways. For example, if the application 104 is executing on the server computing system 400 as illustrated in the example of FIG. 4A, the application 104 displays the new customized version of the UI component 110 by sending data representing the new customized version of the UI component 110 to the user computing systems 404. In another example, if the application 104 is executing on one of the user computing systems 404 as illustrated in the example of FIG. 4B, the application 104 can display the new customized version of the UI component 110 using a display device attached to the user computing system.

As discussed above, the new solution's change list was stored prior to installation of the new solution. Furthermore, the application 104 automatically applies the changes specified by the customization change list after applying changes specified by the new solution's change list. Consequently, there may be no need for the client 102 to manually apply the client customizations to the UI component 110 when the new solution is installed.

Figure 7:
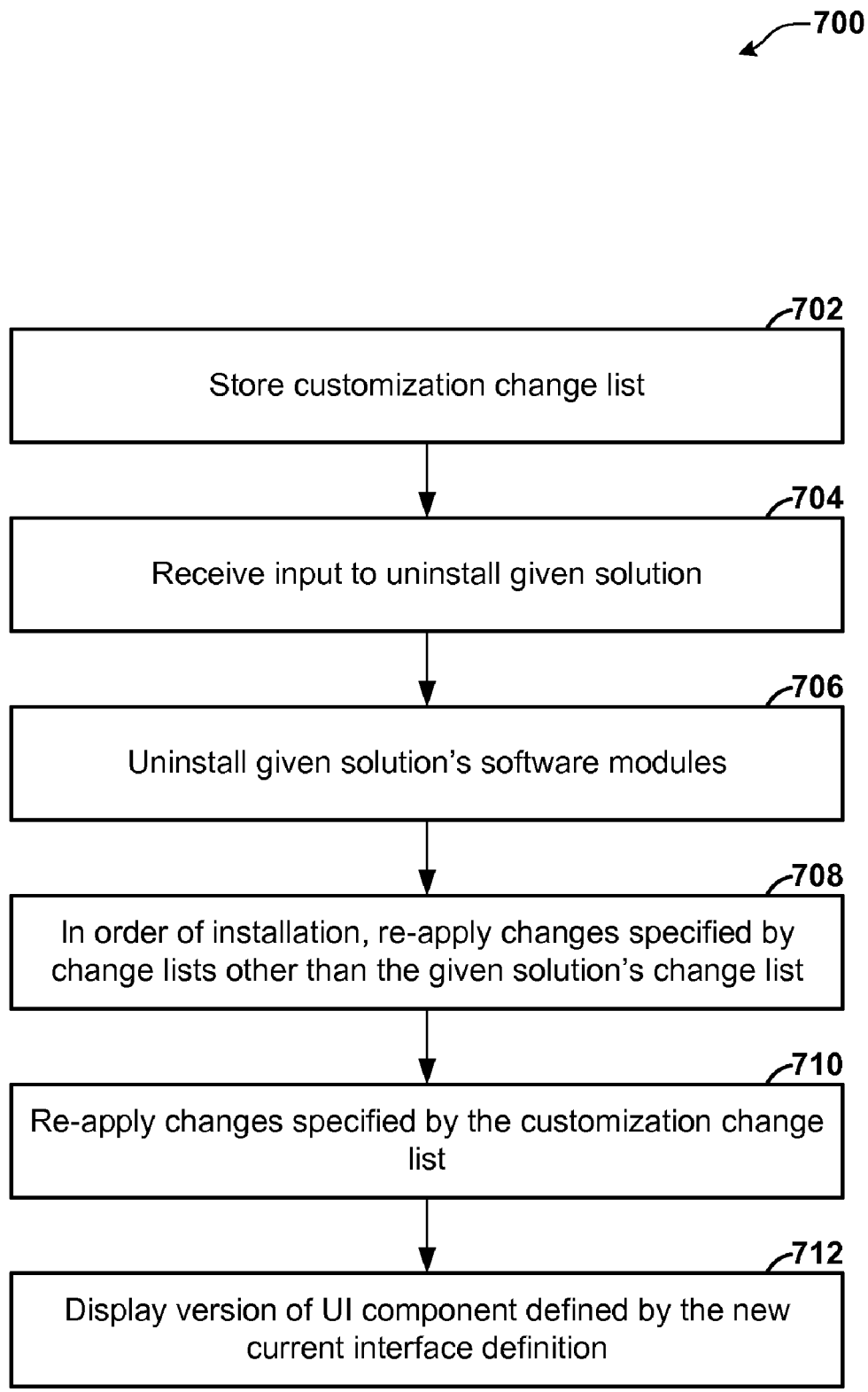
FIG. 7 is a flowchart illustrating an example operation to uninstall a solution having a change list.

FIG. 7 is a flowchart illustrating an example operation 700 to uninstall a solution having a change list. As illustrated in the example of FIG. 7, the application 104 stores customization change list (702). The customization change list comprises a set of change items associated with client customizations to the UI component 110.

Subsequently, the application 104 receives an input to uninstall a given solution in the solution set (704). In various embodiments, the application 104 can receive the input to uninstall the given solution in various ways. For example, in some embodiments, the UI component 110 provides features that allow the client 102 to select solutions for uninstallation. In another example, the client 102 can enter commands in a command line interface to uninstall the given solution. In yet another example, the client 102 can uninstall the given solution by removing one or more files associated with the given solution from a storage location.

In response to receiving the input to uninstall the given solution, the application 104 uninstalls the given solution's software modules (706). In various embodiments, the application 104 can perform various actions to uninstall the given solution's software modules. For example, in some embodiments, the application 104 can uninstall the given solution's software modules by deleting one or more files containing computer-readable instructions related to the given solution. In another example, the application 104 can reconfigure settings of the application 104 such that computer-readable instructions related to the given solution are skipped.

The application 104 generates a new non-customized interface definition by applying the changes in the change lists for remaining solutions to the base interface definition in order of installation of the remaining solutions (708). The remaining solutions are solutions in the solution set other than the given solution. To apply the changes specified by the change lists for the remaining solutions, the application 104 applies the changes specified by the change list of the first installed remaining solution to the base interface definition, thereby generating a modified interface definition. The application 104 then applies the changes specified by the change list of the second installed remaining solution to the modified interface definition, thereby generating a further modified interface definition. The application 104 continues to apply changes in this way for each of the solutions in the solution set other than the given solution. For example, there can be three managed solutions in the solution set. In this example, a first managed solution was installed first, a second managed solution was installed second, and a third managed solution was installed third. In this example, the second managed solution is to be uninstalled. In this example, the application 104 first applies the changes specified by the first solution's change list to the base interface definition, resulting in a modified interface definition. In this example, the application 104 then applies the changes specified by the third solution's change list to the modified interface definition, resulting in the new non-customized interface definition.

After generating the new non-customized interface definition, the application 104 generates a new customized interface definition by applying the changes specified by the customization change list to the new non-customized interface definition (710). After generating the new customized interface definition, the application 104 displays a version of the UI component 110 defined by the new customized interface definition (712). As discussed above, the change list of the customization solution was stored prior to un-installation of the given solution. Furthermore, the application 104 automatically re-applies changes specified by the change list of the customization solution after re-applying changes specified by the change list of the solutions other than the uninstalled solution. Consequently, there may be no need for the client 102 to manually apply the client customizations to the UI component 110 when the given solution is uninstalled.

Figure 8:
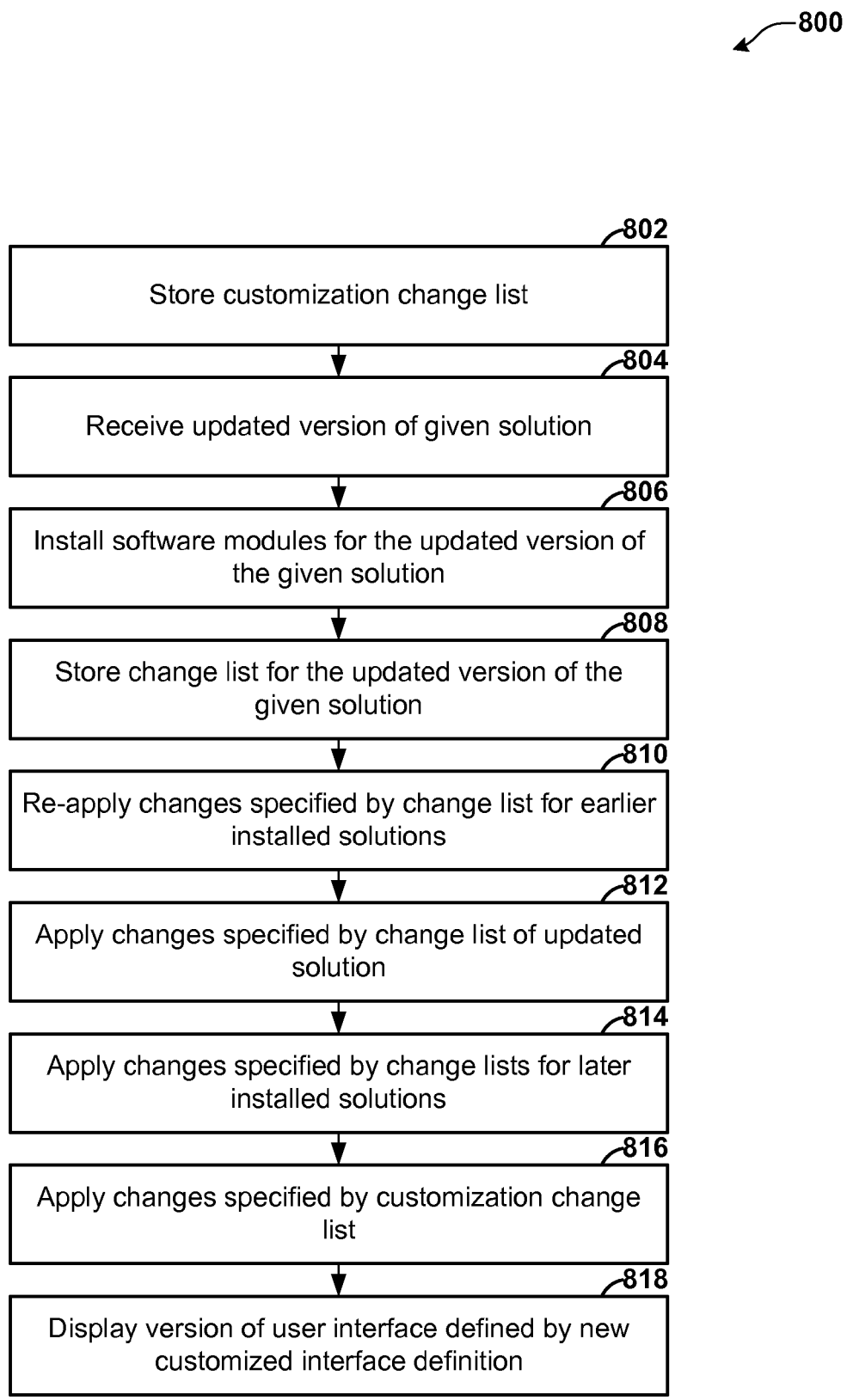
FIG. 8 is a flowchart illustrating an example operation to update a solution having a change list.

FIG. 8 is a flowchart illustrating an example operation 800 to update a solution having a change list. As illustrated in the example of FIG. 8, the application 104 stores the customization change list (802). The customization change list comprises a set of change items associated with client customizations to the UI component 110.

Subsequently, the application 104 receives an updated version of a given solution in the solution set (804). The updated version of the given solution can include updated software modules and/or an updated change list. For example, the updated version of the given solution can provide additional functionality to the given solution or correct programming errors in the previous version of the given solution.

After receiving the updated version of the given solution, the application 104 installs the software modules for the updated version of the given solution (806). When the application 104 installs the software modules for the updated version of the given solution, the application 104 replaces some or all existing software modules for the given solution. Furthermore, after receiving the updated version of the given solution, the application 104 stores the change list for the updated version of the given solution (808). In some embodiments, the application 104 stores the change list for the updated version of the given solution by updating an entry in the component-specific table 516 that contained a previous version of the change list for the given solution.

The application 104 then generates a modified interface definition by re-applying the changes specified by the earlier change lists to the base interface definition (810). The earlier change lists are the change lists for each solution in the solution set installed before the given solution. The changes in the earlier change lists are applied in the order of the installation of the solutions installed before the given solution. The application 104 then generates a further modified interface definition by applying the changes specified by the updated change list for the given solution to the modified interface definition (812). After generating the further modified interface definition, the application 104 generates a new non-customized interface definition by applying the changes specified by the later change lists to the further modified interface definition (814). The later change lists are the change lists for solutions in the solution set installed after the given solution. The later change lists are applied in the order of the installation of the solutions installed after the given solution.

After generating the new non-customized interface definition, the application 104 generates a new customized interface definition by applying the changes specified by the customization change list to the new non-customized interface definition (816). After generating the new customized interface definition, the application 104 displays a version of the UI component 110 defined by the new customized interface definition (818). As discussed above, the customization change list was stored prior to receiving the updated version of the given solution. Furthermore, the application 104 automatically applies the changes specified by the customization change list after applying changes specified by the change lists of the managed solutions. Consequently, there may be no need for the client 102 to manually apply the client customizations to the UI component 110 when the updated version of the given solution is received.

Figure 9:
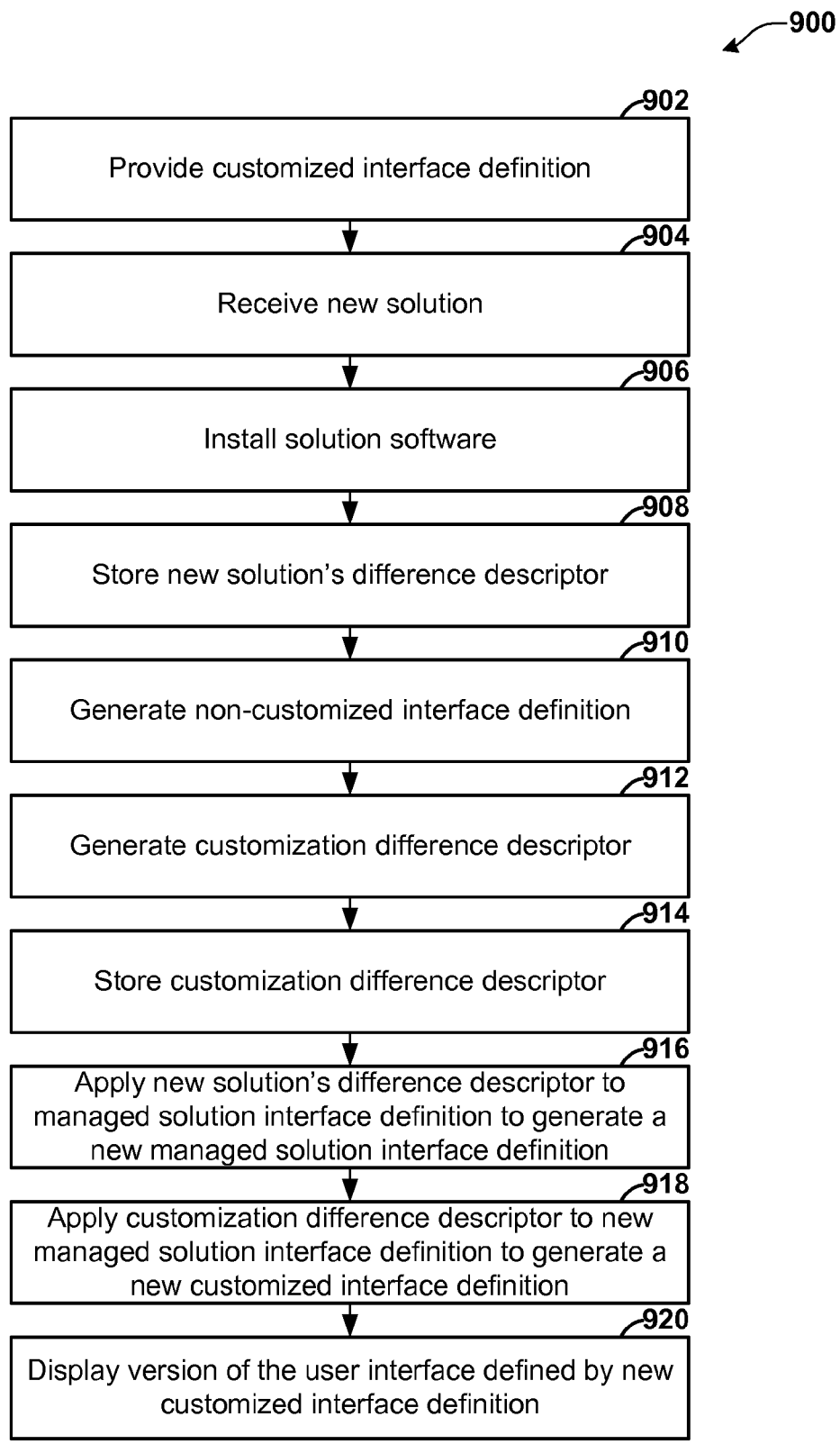
FIG. 9 is a flowchart illustrating an example operation to install a solution having a difference descriptor.

FIG. 9 is a flowchart illustrating an example operation 900 to install a solution having a difference descriptor. As illustrated in the example of FIG. 9, a customized interface definition is provided (902). The customized interface definition defines a version of the UI component 110 to which client customizations have been applied.

Subsequently, the application 104 receives a new solution (904). The new solution includes one or more components. In various embodiments, the application 104 can receive the new solution in various ways. For example, the application 104 can receive the new solution from one or more optical discs, magnetic disks, solid-state memory devices, or other computer-readable data storage media. In another example, the application 104 can receive the new solution from a wired or wireless network connection.

Like the solutions discussed elsewhere in this specification, the new solution comprises one or more solution components. The solution components of the new solution can include a difference descriptor. A difference descriptor is a document that denotes differences between a source interface definition and a destination interface definition. In some embodiments, difference descriptors can omit some portions of the source interface definition. For instance, in some embodiments, difference descriptors can omit elements of the source interface definition that are not ancestor elements of elements that differ from the source interface definition.

The destination interface definition of the new solution's difference descriptor defines a version of the UI component 110 as the ISV 106 intended the UI component 110 to appear after installation of the new solution. For example, if the UI component 110 is a form and the ISV 106 intends the UI component 110 to include an extra field, the destination interface definition defines the UI component 110 to include the extra field.

Difference descriptors can denote differences from various source interface definitions. For example, a difference descriptor can denote differences from a base interface definition for the UI component 110. In another example, a given solution's difference descriptor can denote differences from an interface definition generated when another solution is installed.

To denote differences between a source interface definition and a destination interface definition, a difference descriptor includes change attributes that indicate how elements in the difference descriptor differ from corresponding elements in a source interface definition. A change attribute can indicate that an element has been added to the source interface definition, an element has been removed from the source interface definition, or an element in the source interface definition has been modified. For example, the new solution's difference descriptor can include an element that was not present in the source interface definition. In this example, the element includes a change attribute that indicates that the element has been added. In another example, the new solution's difference descriptor can include an element that was present in the source interface definition, but is not used in forming the version of the UI component 110 defined by the new solution's difference descriptor. In this example, the new solution's difference descriptor includes the element, but the element includes a change attribute that indicates that the element is removed. In this example, if the element represents a section of a form, removing the element removes the section from the new solution's version of the UI component 110. In another example, the new solution's difference descriptor can include an element that was present in the source interface definition, but whose attributes are different in the new solution's difference descriptor. In this example, the element includes a change attribute indicating that the event has been modified.

The following is a portion of an example difference descriptor. This example difference descriptor denotes differences in a form defined in a source interface descriptor and a destination interface descriptor. XML code defining the form is enclosed between "form" elements. The difference descriptor includes a "tab" element that defines a tab within the form. For the sake of brevity, the closing "tab" element is omitted. The "tab" element includes a "solutionaction" attribute that has a value of "modified." The "solutionaction" attribute is a change attribute that indicates that the "tab" element has been modified from a source interface definition. In addition, the difference descriptor includes a "section" element that defines a section within the tab. The "section" tag includes a "solutionaction" attribute with a value of "modified." In this way, the difference descriptor denotes that in the destination interface definition, the "section" tag has been modified from the source interface definition. Furthermore, the example difference descriptor includes a "cell" tag that defines a cell in a row of the section. The "cell" tag includes a "solutionaction" attribute having a value of "removed." In this way, the difference descriptor denotes that in the destination interface definition, this "cell" tag is removed from the source interface definition.

```
<FormXml>
   <forms type="main">
     <systemform>
       <formid>{9886ead0-4fcc-4747-9a18-08e7a9a6de71}</formid>
       <form>
         <tabs>
           <tab verticallayout="true" id="{2c26e8f7-026f-4d3e-9262-
6523e9accb2b}" IsUserDefined="0" name="{2c26e8f7-026f-4d3e-9262-
6523e9accb2b}" solutionaction="Modified">
             <columns>
               <column width="100%" id="0">
                 <sections>
                   <section showlabel="false" showbar="false"
id="{5a43a4e9-5370-4ee7-9f71-9ef915467f90}" IsUserDefined="0"
columns="11" name="{5a43a4e9-5370-4ee7-9f71-9ef915467f90}"
solutionaction="Modified">
                     <rows>
                       <row>
                         <cell id="{fe0f5b16-6f30-43fb-bec1-
9d64e9a7e50a}" ordinalvalue="8" solutionaction="Modified" />
                       </row>
                       <row>
                         <cell id="{83544d0c-a585-4e0b-8c03-
7faa3a3ae3b0}" ordinalvalue="8" solutionaction="Removed" />
                       </row>
                       ...
```

In some embodiments, the client 102 can export client customizations for installation on other computing systems. In some such embodiments, this can be accomplished by providing the customization difference descriptor to the other computing systems. For instance, in the example of FIG. 4B, the customization difference descriptor can be created at the user computing system 404A and then provided to the user computing systems 404B through 404N. In this way, the user computing systems 404B through 404N can have the same client customizations as the user computing system 404A.

After receiving the new solution, the application 104 installs software modules for the new solution (906). The new solution's software modules are sets of computer-readable instructions that, when run by the computing system 500, cause the application 104 to provide additional functionality.

Furthermore, after receiving the new solution, the application 104 stores the new solution's difference descriptor in the database 506 (908). By storing the new solution's difference descriptor in the database 506, the new solution's difference descriptor is available for use by the application 104 when the solution set is modified again in the future.

Next, the application 104 generates a non-customized interface definition (910). The non-customized interface definition is an interface definition that defines a version of the UI component 110 that results from applying the modifications provided by the existing managed solutions to a base version of the UI component 110. In the context of FIG. 9, the non-customized interface definition is an interface definition generated by applying each of the managed solution's difference descriptors to a base interface definition in the order in which the managed solutions were installed. The existing solutions are managed solutions that already exist in the solution set. As a result, the non-customized interface definition defines a version of the UI component 110 before client customizations are applied to the UI component 110.

The following example illustrates the process of generating the non-customized interface definition. In this example, there are three existing solutions. First, the application 104 generates a modified interface definition by applying the difference descriptor for the first-installed existing solution to the base interface definition. Second, the application 104 generates a further modified interface definition by applying the difference descriptor for the second-installed existing solution to the modified interface definition. Third, the application 104 generates the non-customized interface definition by applying the difference descriptor for the third-installed existing solution to the further modified interface definition.

In various embodiments, the application 104 performs various actions to apply a difference descriptor to an existing interface definition. For example, in some embodiments, the application 104 begins a process to apply a difference descriptor to an existing interface definition by copying the existing interface definition into a new interface definition. The application 104 then scans through the difference descriptor for elements having change attributes. When the application 104 detects an element in the difference descriptor having a change attribute, the application 104 determines whether the change attribute indicates that an element is added, removed, or changed.

If the change attribute indicates that the element is added, the application 104 identifies a closest common ancestor element. Elements in interface definitions and difference descriptors are organized into an element hierarchy. As one proceeds up the element hierarchy of the difference descriptors from the added element, the closest common ancestor element is the first element in the interface definition that corresponds to an ancestor element of the added element. After identifying the closest common ancestor element, the application 104 inserts the added element into the new interface definition as a child of the closest common ancestor element in the element hierarchy.

If the change attribute indicates that the element is deleted, the application 104 determines whether the new interface definition includes a corresponding element. The corresponding element is an element in the new interface definition that corresponds to the deleted element. If the new interface definition does not include a corresponding element, the application 104 does not change the new interface definition. If the new interface definition includes a corresponding element, the application 104 removes the corresponding element from the new interface definition. In some embodiments, an interface definition can indicate protected elements that cannot be deleted. When a difference descriptor is applied to such an interface definition, the application 104 disregards differences in the difference descriptor related to such protected elements.

If the change attribute indicates that the element is changed, the application 104 determines whether the new interface definition includes a corresponding element. The corresponding element is an element in the new interface definition that corresponds to the changed element. If the new interface definition does not include a corresponding element, the application 104 disregards the changed element. If the new interface definition includes a corresponding element, the application 104 modifies non-change attributes of the corresponding element to match the non-change attributes of the changed element. Non-change attributes are attributes other than the change attribute. In some embodiments, an interface definition can indicate protected elements that cannot be changed. When a difference descriptor is applied to such an interface definition, the application 104 disregards differences in the difference descriptor related to such protected elements.

When the change attribute indicates that the element is modified, there can be a conflict with modifies previously applied to the element. For example, an initial version of an interface definition includes a container element that represents a container in a form. A columns attribute of the container element specifies that the container has two columns. A first difference descriptor denotes differences from the initial version of the interface definition. In the first difference descriptor, the columns attribute of the container element has been changed from two to three. Furthermore, in the first difference descriptor, a text input box has been added to the third column of the container. A second difference descriptor denotes differences from the initial version of the interface definition. In the second difference descriptor, the columns attribute has been changed from two to one. Hence, there is a conflict between the differences listed by the first difference descriptor and the differences listed by the second difference descriptor.

The application 104 provides conflict resolution routines for resolving different types of conflicting changes. For example, in the example provided above, the application 104 can provide a conflict resolution routine for resolving issues related to reducing the numbers of columns in containers in forms. In this example, the conflict resolution routine rewrites the new interface definition such that elements, such as text inbox boxes and buttons, in the container are redistributed into the remaining columns of the container. For instance, if the number of columns of a container is reduced from three to one, the elements in the second and third columns are added to the remaining column. In another instance, if the number of columns of a container is reduced from three to two, the elements in the first, second, and third columns are redistributed among the first and second columns such that the first and second column have approximately the same number of elements.

In another example, the UI component 110 is a pick list. In this example, a base interface definition includes item elements that define each item in the pick list. Each item element includes an item identifier that identifies the item element. In this example, managed solutions can add items to pick lists, remove items from pick lists, change the labels of items on pick lists, reorder items in pick lists, or otherwise modify pick lists. In this example, a difference descriptor for a first managed solution indicates that a new item with an item identifier of "20" is added to the pick list defined by the base interface definition. Furthermore, a difference descriptor for a second managed solution indicates that a different item with an item identifier of "20" is added to the pick list defined by the base interface definition. Because there are now two items with an item identifier of "20," there is a conflict between the difference descriptor for the first managed solution and the difference descriptor for the second managed solution.

In this example, various mechanisms can be used to conflicts between pick list item identifiers. For example, an ISV can add a publisher prefix to item identifiers of pick list items added by solutions published by the ISV. In this example, a publisher prefix is a value hashed from a publisher prefix string. In some instances, the publisher prefix string is a string assigned to entities that publish managed solutions. In this example, the publisher prefix string for the ISV 106 can be "publisherX" and the publisher prefix can be "63604." In this example, the item identifiers of pick list items added by solutions published by the ISV 106 can be "6360400000001," "6360400000002," "6360400000003," and so on. Furthermore, other publisher prefix strings are assigned to the base interface definition and client customizations. Because different publishers have different publisher prefixes and because the publisher prefixes are added to item identifiers, the chance of a collision between two item identifiers is reduced.

In yet another example, a client customization may add a button to a section of a site map. The section was added to the site map by a managed solution. The managed solution can subsequently be uninstalled. In this example, there is a conflict between the client customizations adding the button and the uninstallation of the managed solution removing the section containing the button. In this example, the application 104 rewrites the interface definition defining the site map to include the button in an "orphans" section of the site map. The "orphans" section of the site map includes elements that do not belong on any other section of the site map.

After generating the non-customized interface definition, the application 104 generates a customization difference descriptor (912). The customization difference descriptor is a document that denotes differences between the customized interface definition and the non-customized interface definition. For example, the UI component 110 can be a form and the client 102 can customize the UI component 110 to hide a section of the form that would otherwise be visible in the UI component 110. In this example, the customization difference descriptor would denote that the section is hidden. After generating the customization difference descriptor, the application 104 stores the customization difference descriptor (914). Next, the application 104 generates a new non-customized interface definition by applying the new solution's difference descriptor to the non-customized interface definition (916).

After generating the new non-customized interface definition, the application 104 generates a new customized interface definition by applying the customization difference descriptor to the new non-customized interface definition (918). The application 104 then displays a customized version of the UI component 110 defined by the new customized interface definition (920).

As discussed above, the customization difference descriptor was generated and stored prior to changing the non-customized interface definition. Furthermore, the application 104 automatically applies the customization difference descriptor after applying the existing difference descriptors. Consequently, there may be no need for the client 102 to manually apply the client customizations to the UI component 110 when a new solution is received.

Figure 10:
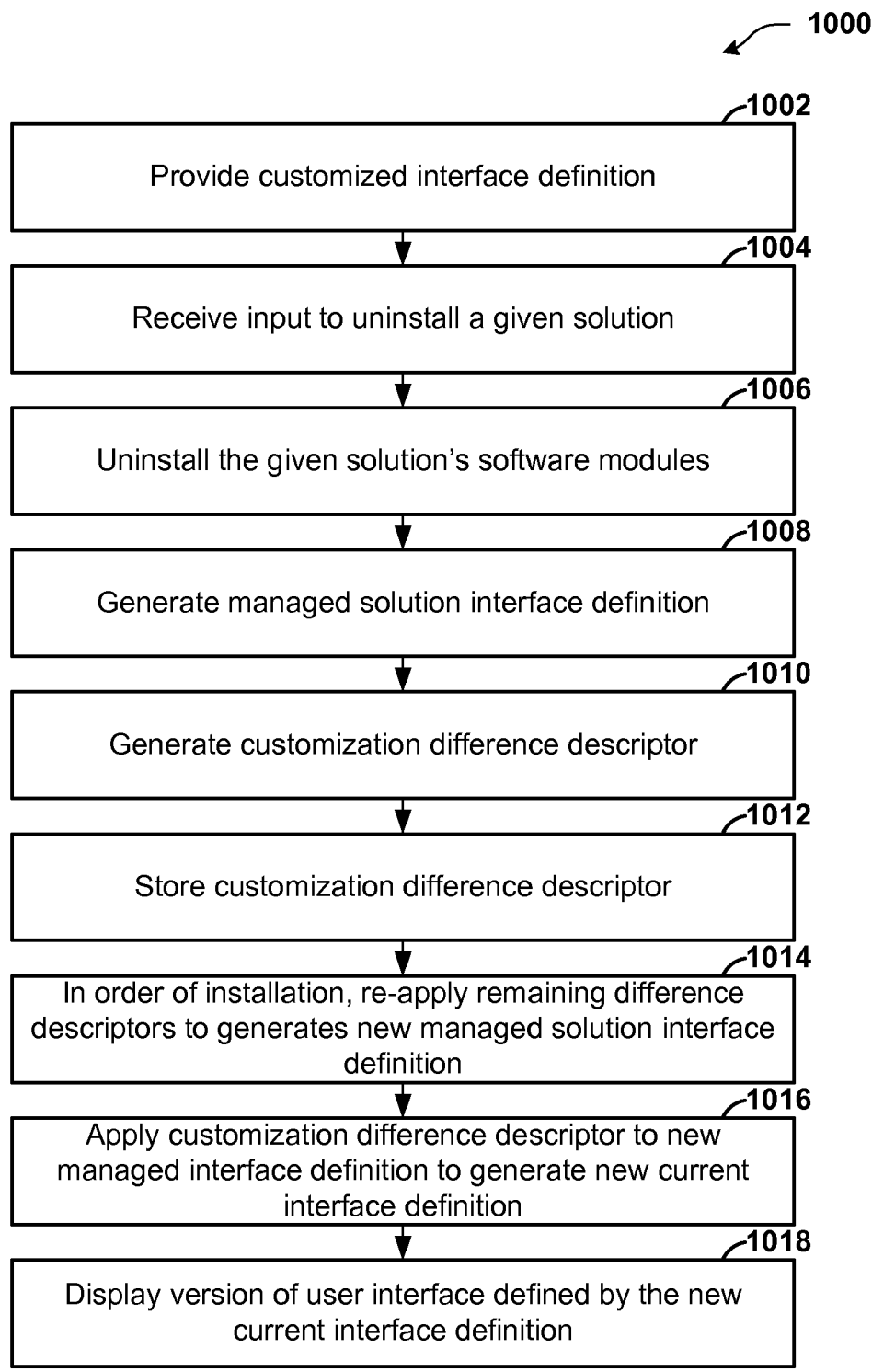
FIG. 10 is a flowchart illustrating an example operation to uninstall a solution having a difference descriptor.

FIG. 10 is a flowchart illustrating an example operation 1000 to uninstall a solution that has a difference descriptor. As illustrated in the example of FIG. 10, the application 104 provides a customized interface definition (1002). The customized interface definition defines a version of the UI component 110 to which client customizations have been applied. Subsequently, the application 104 receives input to uninstall a given solution in the solution set (1004).

In response to receiving the input to uninstall the given solution, the application 104 uninstalls the given solution's software modules (1006). In various embodiments, the application 104 can perform various actions to uninstall the given solution's software modules. For example, in some embodiments, the application 104 can uninstall the given solution's software modules by deleting computer-readable instructions related to the given solution. In another example, the application 104 can reconfigure settings of the application 104 such that computer-readable instructions related to the given solution are skipped.

Next, the application 104 generates a non-customized interface definition (1008). Like the non-customized interface definition discussed in the example of FIG. 9, the non-customized interface definition is the interface definition resulting from applying existing difference descriptors to the base interface definition of the application 104. The application 104 applies the existing difference descriptors in the order in which the existing solutions were installed.

The application 104 then generates a customization difference descriptor (1010). The customization difference descriptor is a document that denotes differences between the customized interface definition and the non-customized interface definition. After generating the customization difference descriptor, the application 104 stores the customization interface definition (1012).

After storing the customization difference descriptor, the application 104 generates a new non-customized interface definition by re-applying remaining interface definitions to the base interface definition (1014). The remaining interface definitions are interface definitions for remaining solutions. The remaining solutions are solutions in the solution set other than the given solution. The application 104 applies the remaining interface definitions in the order in which the remaining solutions were installed.

After generating the new non-customized interface definition, the application 104 generates a new customized interface definition by applying the customization difference descriptor to the new non-customized interface definition (1016). The application 104 then displays a version of the UI component 110 defined by the new customized interface definition (1018).

As discussed above, the customization difference descriptor was generated and stored prior to changing the non-customized interface definition. Furthermore, the application 104 automatically applies the customization difference descriptor after applying the remaining difference descriptors. Consequently, there may be no need for the client 102 to manually apply the client customizations to the UI component 110 when a solution is uninstalled.

Figure 11:
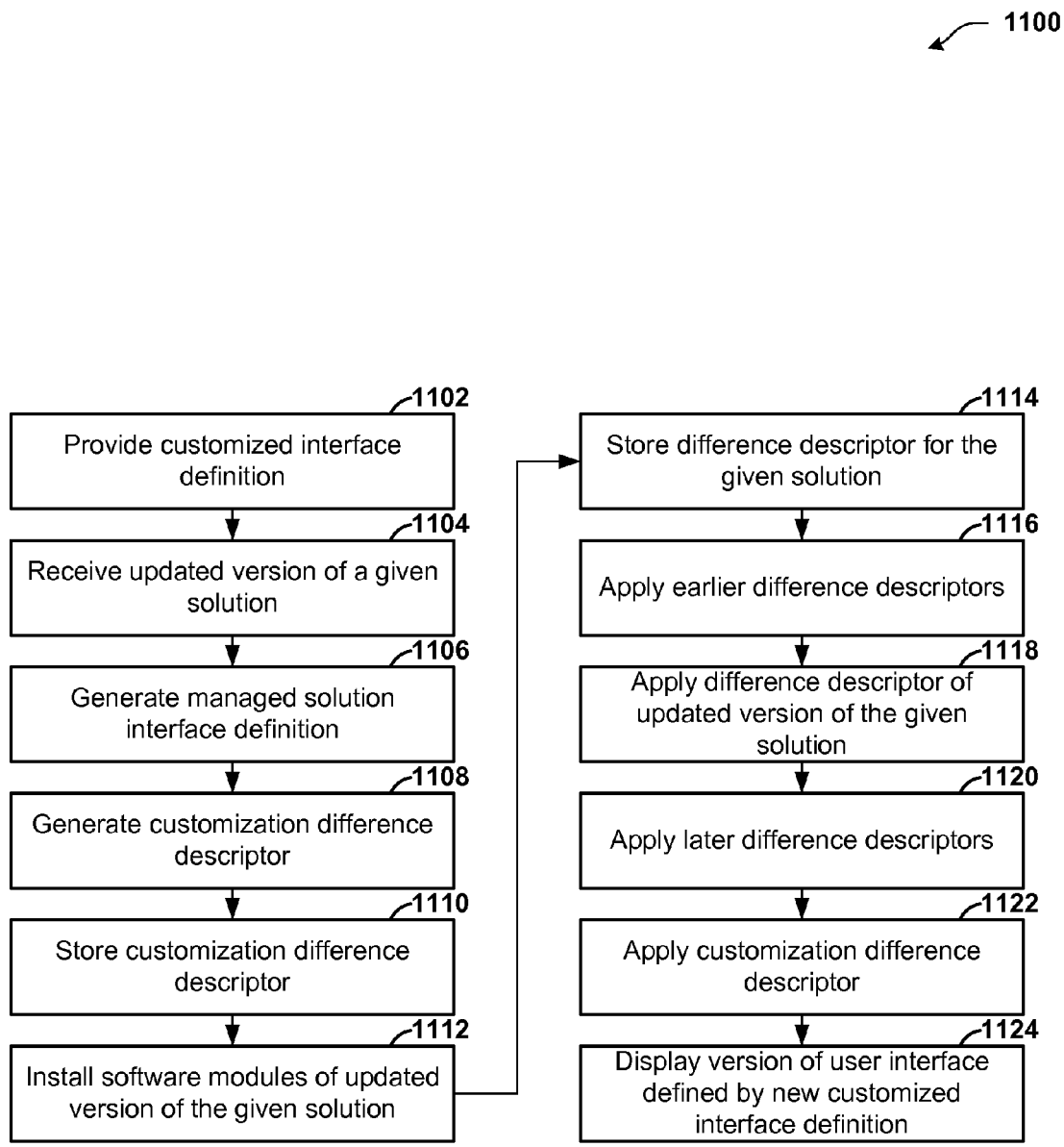
FIG. 11 is a flowchart illustrating an example operation to update a solution having a difference descriptor.

FIG. 11 is a flowchart illustrating an example operation 1100 to update a solution comprising a difference descriptor. As illustrated in the example of FIG. 11, the application 104 provides a customized interface definition (1102). The customized interface definition defines a version of the UI component 110 to which client customizations have been applied. Subsequently, the application 104 receives an updated version of a given solution (1104). The solution components of the updated version of the given solution can include software modules and a difference descriptor.

After receiving the updated version of the given solution, the application 104 generates a non-customized interface definition (1106) Like the non-customized interface definition discussed above with regard to the examples of FIGS. 9 and 10, the non-customized interface definition is the interface definition resulting from applying modifications provided by solutions in the solution set to the base interface definition of the UI component 110. The application 104 applies the existing difference descriptors in the order in which the solutions were installed.

Next, the application 104 generates a customization difference descriptor (1108). The customization difference descriptor is a document that denotes differences between the customized interface definition and the non-customized interface definition. After generating the customization difference descriptor, the application 104 stores the customization difference descriptor (1110).

Next, the application 104 installs the software modules of the updated version of the given solution (1112). The application 104 then stores the difference descriptor of the updated version of the given solution (1114). By storing the difference descriptor of the updated version of the given solution, the difference descriptor of the updated version of the given solution is available for use by the application 104 when the solution set is modified again in the future.

The application 104 then generates a modified interface definition by applying earlier difference descriptors to the base interface definition (1116). The earlier difference descriptors are difference descriptors for earlier-installed solutions. The earlier-installed solutions are solutions in the solution set that were installed before the given solution was initially installed. The application 104 applies the earlier difference descriptors in the order in which the earlier-installed solutions were installed.

The application 104 then generates a further modified interface definition by applying the difference descriptor of the updated version of the given solution to the modified interface definition (1118). After generating the further modified interface definition, the application 104 generates a new non-customized interface definition by applying later difference descriptors to the further modified interface definition (1120). The later difference descriptors are the difference descriptors for later-installed solutions. The later-installed solutions are solutions in the solution set that were installed later than the given solution. The application 104 applies the later difference descriptors in the order in which the later-installed solutions were installed.

After the application 104 generates the new non-customized interface definition, the application 104 generates a new customized interface definition by applying the customization difference descriptor to the new non-customized interface definition (1122). After the application 104 generates the new customized interface definition, the application 104 displays a version of the UI component 110 defined by the new customized interface definition (1122).

As discussed above, the customization difference descriptor was generated and stored prior to receiving the updated version of the given solution. Furthermore, the application 104 automatically applies the customization difference descriptor after applying the earlier difference descriptors, the difference descriptor of the updated version of the given solution, and the later difference descriptors. Consequently, there may be no need for the client 102 to manually apply the client customizations to the UI component 110 when an updated solution is received.

Figure 12:
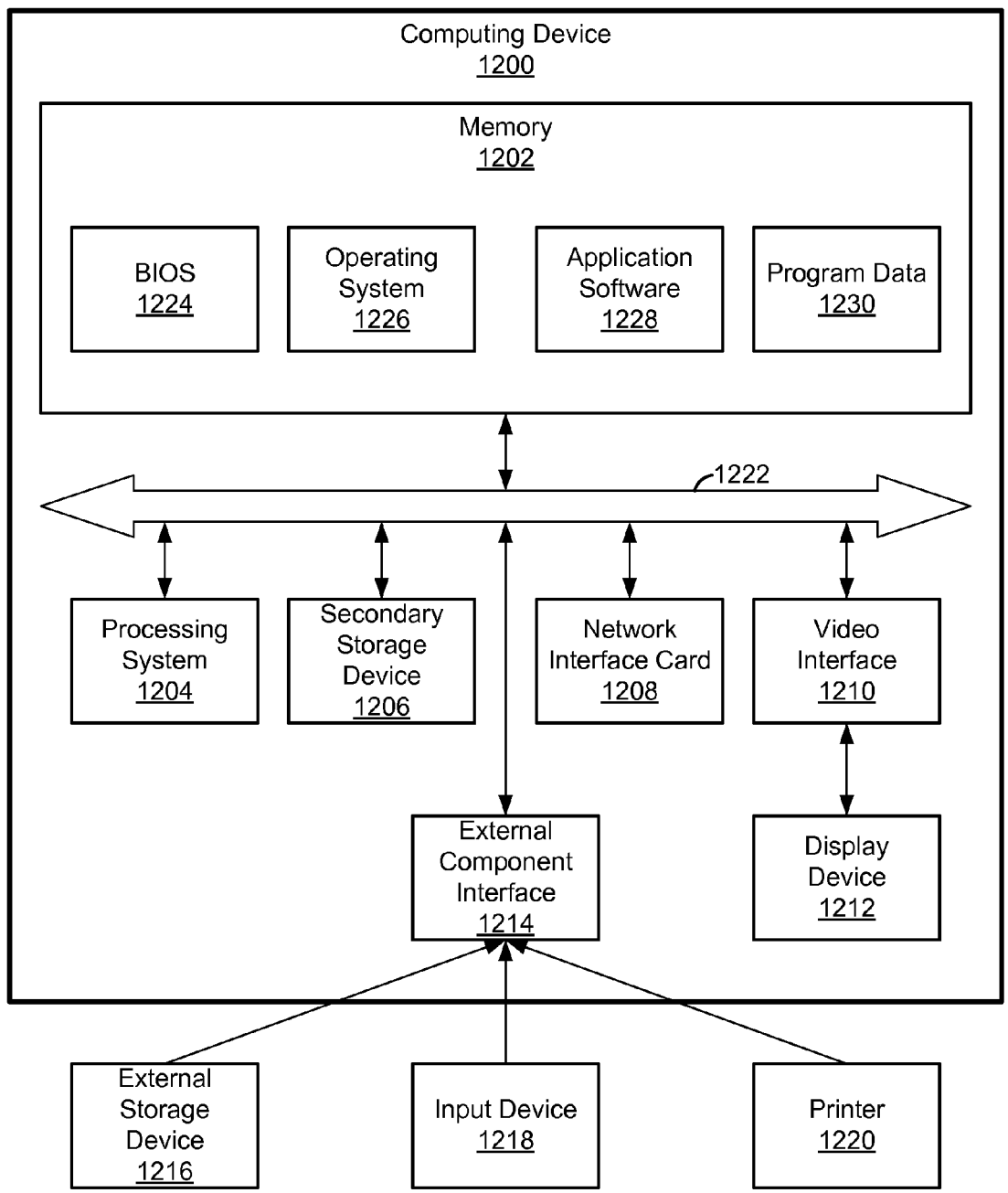
FIG. 12 is a block diagram illustrating an example computing device.

FIG. 12 is a block diagram illustrating an example computing device 1200. In some embodiments, the server computing system 400 and/or the user computing systems 404 are implemented using one or more computing devices like the computing device 1200. It should be appreciated that in other embodiments, the server computing system 400 and/or the user computing systems 404 are implemented using computing devices having hardware components other than those illustrated in the example of FIG. 12.

In different embodiments, computing devices are implemented in different ways. For instance, in the example of FIG. 12, the computing device 1200 comprises a memory 1202, a processing system 1204, a secondary storage device 1206, a network interface card 1208, a video interface 1210, a display device 1212, an external component interface 1214, an external storage device 1216, an input device 1218, a printer 1220, and a communication medium 1222. In other embodiments, computing devices are implemented using more or fewer hardware components. For instance, in another example embodiment, a computing device does not include a video interface, a display device, an external storage device, or an input device.

The term computer readable media as used herein may include computer storage media. Computer storage media may include volatile and nonvolatile, removable and non-removable media implemented in any method or technology for storage of information, such as computer readable instructions, data structures, program modules, or other data. The memory 1202 includes one or more computer storage media capable of storing data and/or instructions. As used in this document, a computer storage medium is a device or article of manufacture that stores data and/or software instructions readable by a computing device. In different embodiments, the memory 1202 is implemented in different ways. For instance, in various embodiments, the memory 1202 is implemented using various types of computer storage media. Example types of computer storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The processing system 1204 includes one or more physical integrated circuits that selectively execute software instructions. In various embodiments, the processing system 1204 is implemented in various ways. For instance, in one example embodiment, the processing system 1204 is implemented as one or more processing cores. For instance, in this example embodiment, the processing system 1204 may be implemented as one or more Intel Core 2 microprocessors. In another example embodiment, the processing system 1204 is implemented as one or more separate microprocessors. In yet another example embodiment, the processing system 1204 is implemented as an ASIC that provides specific functionality. In yet another example embodiment, the processing system 1204 provides specific functionality by using an ASIC and by executing software instructions.

In different embodiments, the processing system 1204 executes software instructions in different instruction sets. For instance, in various embodiments, the processing system 1204 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 1206 includes one or more computer storage media. The secondary storage device 1206 stores data and software instructions not directly accessible by the processing system 1204. In other words, the processing system 1204 performs an I/O operation to retrieve data and/or software instructions from the secondary storage device 1206. In various embodiments, the secondary storage device 1206 is implemented by various types of computer storage media. For instance, the secondary storage device 1206 may be implemented by one or more magnetic disks, magnetic tape drives, CD-ROM discs, DVD-ROM discs, Blu-Ray discs, solid state memory devices, Bernoulli cartridges, and/or other types of computer storage media.

The network interface card 1208 enables the computing device 1200 to send data to and receive data from a computer communication network. In different embodiments, the network interface card 1208 is implemented in different ways. For example, in various embodiments, the network interface card 1208 is implemented as an Ethernet interface, a token-ring network interface, a fiber optic network interface, a wireless network interface (e.g., WiFi, WiMax, etc.), or another type of network interface.

The video interface 1210 enables the computing device 1200 to output video information to the display device 1212. In different embodiments, the video interface 1210 is implemented in different ways. For instance, in one example embodiment, the video interface 1210 is integrated into a motherboard of the computing device 1200. In another example embodiment, the video interface 1210 is a video expansion card. Example types of video expansion cards include Radeon graphics cards manufactured by Advanced Micro Devices, Inc. of Sunnyvale, Calif., Geforce graphics cards manufactured by Nvidia Corporation of Santa Clara, Calif., and other types of graphics cards.

In various embodiments, the display device 1212 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 1210 communicates with the display device 1212 in various ways. For instance, in various embodiments, the video interface 1210 communicates with the display device 1212 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 1214 enables the computing device 1200 to communicate with external devices. In various embodiments, the external component interface 1214 is implemented in different ways. For instance, in one example embodiment, the external component interface 1214 is a USB interface. In other example embodiments, the computing device 1200 is a FireWire interface, a serial port interface, a parallel port interface, a PS/2 interface, and/or another type of interface that enables the computing device 1200 to communicate with external components.

In different embodiments, the external component interface 1214 enables the computing device 1200 to communicate with different external components. For instance, in the example of FIG. 12, the external component interface 1214 enables the computing device 1200 to communicate with the external storage device 1216, the input device 1218, and the printer 1220. In other embodiments, the external component interface 1214 enables the computing device 1200 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 1200.

The external storage device 1216 is an external component comprising one or more computer readable data storage media. Different implementations of the computing device 1200 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer storage media. The input device 1218 is an external component that provides user input to the computing device 1200. Different implementations of the computing device 1200 interface with different types of input devices. Example types of input devices include, but are not limited to, keyboards, mice, trackballs, stylus input devices, key pads, microphones, joysticks, touch-sensitive display screens, and other types of devices that provide user input to the computing device 1200. The printer 1220 is an external device that prints data to paper. Different implementations of the computing device 1200 interface with different types of printers. Example types of printers include, but are not limited to laser printers, ink jet printers, photo printers, copy machines, fax machines, receipt printers, dot matrix printers, or other types of devices that print data to paper.

The communications medium 1222 facilitates communication among the hardware components of the computing device 1200. In different embodiments, the communications medium 1222 facilitates communication among different components of the computing device 1200. For instance, in the example of FIG. 12, the communications medium 1222 facilitates communication among the memory 1202, the processing system 1204, the secondary storage device 1206, the network interface card 1208, the video interface 1210, and the external component interface 1214. In different implementations of the computing device 1200, the communications medium 1222 is implemented in different ways. For instance, in different implementations of the computing device 1200, the communications medium 1222 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1202 stores various types of data and/or software instructions. For instance, in the example of FIG. 12, the memory 1202 stores a Basic Input/Output System (BIOS) 1224, an operating system 1226, application software 1228, and program data 1230. The BIOS 1224 includes a set of software instructions that, when executed by the processing system 1204, cause the computing device 1200 to boot up. The operating system 1226 includes a set of software instructions that, when executed by the processing system 1204, cause the computing device 1200 to provide an operating system that coordinates the activities and sharing of resources of the computing device 1200. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 1228 includes a set of software instructions that, when executed by the processing system 1204, cause the computing device 1200 to provide applications to a user of the computing device 1200. The program data 1230 is data generated and/or used by the application software 1228.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders.

We claim:

1. A method comprising:

providing a computing system;

displaying, by the computing system, a customized user interface (UI) component, the customized UI component being a version of a UI component to which client customizations have been applied, the UI component being a component of a UI of an application, wherein a customized interface definition defines the customized UI component;

modifying a solution set, the solution set comprising one or more solutions that modify the UI component, and modification including adding a new solution to the solution set, wherein adding the new solution to the solution set comprises:

receiving a change list that specifies changes;

generating a new non-customized interface definition by applying applicable changes to a non-customized interface definition, the non-customized interface definition being an interface definition that defines a version of the UI component that results from applying the modifications provided by each solution in the solution set to a base version of the UI component; and after applying the applicable changes to the non-customized interface definition, generating a new customized interface definition by applying changes in a customization change list to the new non-customized interface definition, the customization change list expressing the client customizations, the new customized interface definition defining a new customized UI component; and after the solution set is modified, displaying, by the computing system, the new customized UI component, the new customized UI component being a version of the UI component to which modifications provided by solutions in the solution set are applied and to which the client customizations remain applied to the UI component, the client customizations remaining applied to the UI component without manually re-applying the client customizations to the UI component.

2. The method of claim 1, wherein the solutions add functionality to the application.

3. The method of claim 1, wherein adding the new solution to the solution set comprises:

receiving a difference descriptor for the new solution, the difference descriptor for the new solution being a document that denotes differences between a source interface definition and a destination interface definition, the source interface definition and the destination interface definition defining different versions of the UI component;

generating a customization difference descriptor, the customization difference descriptor being a document that denotes differences between a customized interface definition and a non-customized interface definition, the customized interface definition defining the customized UI component, the non-customized interface definition defining a version of the UI component that results from applying the modifications provided by the solutions to a base version of the UI component;

generating a new non-customized interface definition by applying the difference descriptor for the new solution to the non-customized interface definition; and generating a new customized interface definition by applying the customization difference descriptor to the new non-customized interface definition, the new customized interface definition defining the new customized UI component.

4. The method of claim 1, wherein modifying the solution set comprises: updating a solution that is already in the solution set.

5. The method of claim 1, wherein modifying the solution set comprises: removing a given solution from the solution set.

6. The method of claim 5, wherein removing the given solution from the solution set comprises:

generating a customization difference descriptor, the customization difference descriptor being a document that denotes differences between the customized interface definition and the non-customized interface definition, the customized interface definition defining the customized UI component, the non-customized interface definition defining a version of the UI component that results from applying the modifications provided by the solutions to the base version of the UI component;

generating an updated non-customized interface definition by applying difference descriptors for ones of the solutions other than the given solution to a base interface definition that defines the base version of the UI component; and generating a new customized interface definition by applying the customization difference descriptor to the updated non-customized interface definition, the new customized interface definition defining the new customized UI component.

7. The method of claim 1, wherein the application is a Customer Relationship Management (CRM) application.

8. The method of claim 1, wherein the client customizations include one or more of the following: client customizations to remove one or more elements from the UI component, client customizations to rename one or more elements in the UI component, and client customizations to change positions of one or more elements in the UI component.

9. The method of claim 1, further comprising: exporting the client customizations for installation on another computing system.

10. A computing system comprising:

a processing system; and a data storage system that stores computer-readable instructions that, when executed by the processing system, cause the computing system to:

display a customized UI component, the customized UI component being a version of a UI component to which client customizations have been applied, the UI component being a component of a UI of an application;

modify a solution set by adding, removing, or updating a solution in the solution set, the solution set comprising one or more solutions that modify the UI component, the one or more solutions in the solution set adding functionality to the application; and after the solution set is modified, display a new customized UI component, the new customized UI component being a version of the UI component to which modifications provided by solutions in the solution set are applied and to which the client customizations remain applied to the UI component, the client customizations remaining applied to the UI component without manually re-applying the client customizations to the UI component;

store change lists for the solutions in the solution set; and store a customization change list that expresses the client customizations;

wherein, when the computer-readable instructions cause the computing system to modify the solution set by removing a given solution from the solution set, the computer-readable instructions cause the computing system to:

generate a new non-customized interface definition by applying changes in the change lists for the solutions other than the given solution to a base interface definition that defines a base version of the UI component;

generate a new customized interface definition by applying changes in the customization change list to the new non-customized interface definition, the new customized interface definition defining the new customized UI component;

store a difference descriptor for each solution in the solution set; and modify the solution set by updating a given solution in the solution set, the computer-readable instructions cause the computing system to:

generate a non-customized interface definition, the non-customized interface definition that defines a version of the UI component that results from applying the modifications provided by the solutions to the base version of the UI component;

generate a customization difference descriptor, the customization difference descriptor being a document that denotes differences between a customized interface definition and the non-customized interface definition, the customized interface definition defining the customized UI component;

generate a modified interface definition by applying earlier difference descriptors to the base interface definition that defines the base version of the UI component, the earlier difference descriptors being the difference descriptors for solutions in the solution set that were installed before the given solution was installed;

generate a further modified interface definition by applying the difference descriptor for an updated version of the given solution to the modified interface definition;

generate a new non-customized interface definition by applying later difference descriptors to the further modified interface definition, the later difference descriptors being the difference descriptors for solutions in the solution set that were installed after the given solution was installed; and generate a new customized interface definition by applying the customization difference descriptor to the new non-customized interface definition, the new customized interface definition defining the new customized UI component.

11. The computing system of claim 10, wherein when the computer-readable instructions cause the computing system to modify the solution set by adding a new solution to the solution set, the computer-readable instructions cause the computing system to: receive a change list for the new solution;

generate a new non-customized interface definition by applying changes in the change list for the new solution to a non-customized interface definition, the non-customized interface definition defining a version of the UI component that results from applying the modifications provided by the solutions to the base version of the UI component;

generate a new customized interface definition by applying changes in the customization change list to the new non-customized interface definition, the customization change list specifying the client customizations, the new customized interface definition defining the new customized UI component.

12. The computing system of claim 11, wherein the UI component is one of: a control ribbon, a form, a picklist, and a site map.

13. The computing system of claim 10, wherein when the computer-readable instructions cause the computing system to modify the solution set by removing a given solution in the solution set, the computer-readable instructions cause the computing system to:

generate a customization difference descriptor, the customization difference descriptor being a document that denotes differences between a non-customized interface definition and a customized interface definition, the non-customized interface definition defining a version of the UI component that results from applying the modifications provided by each of the solutions in the solution set to a base version of the UI component, the customized interface definition defining the customized UI component;

generating an updated non-customized interface definition by applying the difference descriptors for ones of the solutions other than the given solution to a base interface definition that defines the base version of the UI component; and generating a new customized interface definition by applying the customization difference descriptor to the updated non-customized interface definition, the new customized interface definition defining the new customized UI component.

14. The computing system of claim 10, wherein the client customizations include one or more of the following: client customizations to remove one or more elements from the UI component, client customizations to rename one or more elements in the UI component, and client customizations to change positions of one or more elements in the UI component.

15. A computer storage medium storing computer-readable instructions that, when executed by a computing system, cause the computing system to:

display a customized version of a user interface (UI) component, the customized version of the UI component being a version of the UI component to which client customizations have been applied, the UI component being a component of a UI of a Customer Relationship Management (CRM) application, wherein the client customizations include one or more of the following: client customizations to remove one or more elements from the UI component, client customizations to rename one or more elements in the UI component, and client customizations to change positions of one or more elements in the UI component adding a first solution to a solution set, the solution set comprising one or more solutions that modify the UI component and add functionality to the CRM application;

after the adding the first solution to the solution set, display a modified customized version of the UI component, the modified customized version of the UI component being a version of the UI component to which modifications provided by solutions in the solution set and the first solution are applied and to which the client customizations remain applied to the UI component without manually re-applying the client customizations to the UI component;

removing a second solution from the solution set;

after the removing the second solution from the solution set, display a further modified customized version of the UI component, the further modified customized version of the UI component being a version of the UI component to which the modifications provided by solutions in the solution set other than the second solution are applied and to which the client customizations remain applied to the UI component without manually re-applying the client customizations to the UI component;

modifying a third solution in the solution set; and after the third solution is modified, display a yet further modified customized version of the UI component, the yet further modified customized version of the UI component being a version of the UI component to which the modifications provided by solutions in the solution set are applied and to which the client customizations remain applied to the UI component without manually re-applying the client customizations to the UI component, wherein modifying the third solution includes adding a new solution to the solution set, including:

receiving a difference descriptor for the new solution, the difference descriptor for the new solution being a document that denotes differences between a source interface definition and a destination interface definition, the source interface definition and the destination interface definition defining different versions of the UI component;

generating a customization difference descriptor, the customization difference descriptor being a document that denotes differences between a customized interface definition and a non-customized interface definition, the customized interface definition defining the customized UI component, the non-customized interface definition defining a version of the UI component that results from applying the modifications provided by the solutions to a base version of the UI component;

generating a new non-customized interface definition by applying the difference descriptor for the new solution to the non-customized interface definition; and generating a new customized interface definition by applying the customization difference descriptor to the new non-customized interface definition, the new customized interface definition defining the new customized UI component.

* * * * *